United States Patent
Wang et al.

(10) Patent No.: US 11,088,875 B2
(45) Date of Patent: Aug. 10, 2021

(54) ASYNCHRONOUS PROCESSING OF BLOCKCHAIN BLOCKS

(71) Applicant: ALIPAY (HANGZHOU) INFORMATION TECHNOLOGY CO., LTD., Zhejiang (CN)

(72) Inventors: Jiyuan Wang, Hangzhou (CN); Xuebing Yan, Hangzhou (CN)

(73) Assignee: Alipay (Hangzhou) Information Technology Co., Ltd., Zhejiang (CN)

( * ) Notice: Subject to any disclaimer, the term of this patent is extended or adjusted under 35 U.S.C. 154(b) by 0 days.

(21) Appl. No.: 17/085,018

(22) Filed: Oct. 30, 2020

(65) Prior Publication Data

US 2021/0160102 A1    May 27, 2021

Related U.S. Application Data

(63) Continuation of application No. PCT/CN2019/121346, filed on Nov. 27, 2019.

(51) Int. Cl.
*H04L 9/32*    (2006.01)
*H04L 12/66*    (2006.01)
(Continued)

(52) U.S. Cl.
CPC ............ *H04L 12/66* (2013.01); *G06F 16/273* (2019.01); *H04L 9/0637* (2013.01); *H04L 9/321* (2013.01);
(Continued)

(58) Field of Classification Search
CPC ........ H04L 12/66; H04L 9/0637; H04L 9/321
See application file for complete search history.

(56) References Cited

U.S. PATENT DOCUMENTS

2018/0349896 A1    12/2018    Arora et al.
2018/0375869 A1*    12/2018    Qiu .................. H04L 63/10
(Continued)

FOREIGN PATENT DOCUMENTS

CN    107301114    10/2017
CN    108259594    7/2018
(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.
(Continued)

*Primary Examiner* — Ellen Tran
(74) *Attorney, Agent, or Firm* — Fish & Richardson P.C.

(57) ABSTRACT

A computer-implemented method includes retrieving, by a bridge device communicatively linked to a blockchain network node of a blockchain network, a first set of blockchain blocks from the blockchain network node using a first set of threads of the bridge device; storing, by the bridge device, the first set of blockchain blocks in the bridge device; and verifying, by the bridge device, a second set of blockchain blocks that are stored in the bridge device using a second set of threads of the bridge device; and wherein retrieving the first set of blockchain blocks and verifying the second set of blockchain blocks are performed asynchronously using the first set of threads and the second set of threads.

20 Claims, 7 Drawing Sheets

(51) Int. Cl.
*G06F 16/27* (2019.01)
*H04L 9/06* (2006.01)

(52) U.S. Cl.
CPC ........ *H04L 9/3265* (2013.01); *H04L 2209/20* (2013.01); *H04L 2209/24* (2013.01); *H04L 2209/26* (2013.01); *H04L 2209/38* (2013.01)

(56) References Cited

U.S. PATENT DOCUMENTS

2019/0034465 A1* 1/2019 Shimamura .......... H04L 9/3239
2019/0238316 A1   8/2019 Padmanabhan

FOREIGN PATENT DOCUMENTS

| CN | 108600353 | 9/2018 |
| CN | 108734453 | 11/2018 |
| CN | 107103054 | 3/2019 |

OTHER PUBLICATIONS

Nakamoto, "Bitcoin: A Peer-to-Peer Electronic Cash System," www.bitcoin.org, 2005, 9 pages.
PCT International Search Report and Written Opinion in International Application No. PCT/CN2019/121346, dated Aug. 26, 2020, 7 pages.
Extended European Search Report in European Application No. 19849486.6, dated Mar. 15, 2021, 7 pages.

* cited by examiner

ASYNCHRONOUS PROCESSING OF BLOCKCHAIN BLOCKS

CROSS-REFERENCE TO RELATED APPLICATIONS

This application is a continuation of PCT Application No. PCT/CN2019/121346, filed on Nov. 27, 2019, which is hereby incorporated by reference in its entirety.

TECHNICAL FIELD

This specification relates to asynchronous processing of blockchain blocks, which can be used, for example, for implementing blockchain-based fault-tolerant systems.

BACKGROUND

Distributed ledger systems (DLSs), which can also be referred to as consensus networks and/or blockchain networks, enable participating entities to securely and immutably store data. DLSs are commonly referred to as blockchain networks without referencing any particular user case. Examples of types of blockchain networks can include public blockchain networks, private blockchain networks, and consortium blockchain networks. A consortium blockchain network is provided for a select group of entities, which control the consensus process, and includes an access control layer.

In some use cases, a blockchain system needs to interact with third-party systems. It is desirable to have a bridging or bridge device to allow communications between a third-party system and a blockchain system. In such interaction systems, it is also desirable to have high throughput and processing efficiency of handling blockchain blocks for the communications between the third-party system and the blockchain system, as well as fault tolerance to ensure orderly communications.

SUMMARY

Described embodiments of the subject matter can include one or more features, alone or in combination. For example, in one embodiment, a method performed by a bridge device, wherein the bridge device is communicatively linked to a blockchain network node of a blockchain network, includes: retrieving a first set of blockchain blocks from the blockchain network node using a first set of threads of the bridge device; storing the first set of blockchain blocks in the bridge device; and verifying a second set of blockchain blocks that are stored in the bridge device using a second set of threads of the bridge device; wherein the first set of threads are different from the second set of threads; and wherein retrieving the first set of blockchain blocks and verifying the second set of blockchain blocks are performed asynchronously using the first set of threads and the second set of threads. In some embodiments, the verifying operation can be performed asynchronously with the retrieving operation, for example, by initiating or otherwise performing the verifying operation without waiting for the retrieving operation to complete. In some embodiments, performing the verifying operation asynchronously with the retrieving operation includes performing the verifying operation before, after, or in parallel with performing the retrieving operation.

In some embodiments, one or more of these general and specific embodiments may be implemented using a device, a system, a method, or a computer-readable media, or any combination of devices, systems, methods, and computer-readable media. The foregoing and other described embodiments can each, optionally, include some, none or all of the following embodiments.

In some embodiments, the first set of blockchain blocks include a first blockchain block and a second blockchain block, wherein the first set of threads include a first thread and a second thread. Retrieving the first set of blockchain blocks from the blockchain network node using the first set of threads of the bridge device includes: retrieving the first blockchain block from the blockchain network node using the first thread of the bridge device in parallel with retrieving the second blockchain block from the blockchain network node using the second thread of the bridge device.

In some embodiments, the second set of blockchain blocks include a third blockchain block and a fourth blockchain block, wherein the second set of threads include a third thread and a fourth thread. Verifying the second set of blockchain blocks that are stored in the bridge device using the second set of threads of the bridge device includes: verifying the third blockchain block using the third thread of the bridge device in parallel with verifying the fourth blockchain block using the fourth thread of the bridge device.

In some embodiments, the method further includes maintaining a remote height value and a local height value in a data store of the bridge device. The remote height value indicates a number of blockchain blocks that are stored on the blockchain network node, and the local height value indicates a number of blockchain blocks that are stored on the bridge device and that have been obtained from the blockchain network node. Retrieving the first set of blockchain blocks from the blockchain network node using the first set of threads of the bridge device includes: determining whether the local height value is less than the remote height value by the bridge device; and in response to determining that the local height value is less than the remote height value, obtaining at least one blockchain block that is not stored on the bridge device from the blockchain network node.

In some embodiments, the method further includes: in response to obtaining the at least one blockchain block from the blockchain network node, storing the at least one blockchain block on the bridge device; and updating the local height value by the bridge device.

In some embodiments, the method further includes: in response to determining that the local height value is not less than the remote height value, refraining from obtaining blockchain blocks from the blockchain network node.

In some embodiments, the method further includes: receiving a notification from the blockchain network node by the bridge device, the notification indicating the remote height value; receiving a transaction request from a client device by the bridge device, the transaction request requesting a transaction to be executed on a blockchain network; sending the transaction request to the blockchain network node by the bridge device; and receiving a second notification from the blockchain network node by the bridge device, the second notification indicating an updated remote height value, wherein the updated remote height value indicates an increase in the number of blockchain blocks that are stored on the blockchain network node based at least in part on the transaction.

In some embodiments, the notification includes a new block notification indicating a new block has been added to a blockchain of the blockchain network, and the new block notification indicates the remote height value is increased.

In some embodiments, receiving the notification from the blockchain network node by the bridge device includes at least one of the following: receiving the notification that is pushed by the blockchain network node to the bridge device; or pulling the notification from the blockchain network node by the bridge device.

In some embodiments, the method further includes: maintaining a local height value and a check height value in a data store of the bridge device. The local height value indicates a number of blockchain blocks that are stored on the bridge device and that have been obtained from the blockchain network node, and the check height value indicates a number of blockchain blocks that have been verified by the bridge device. Verifying the second set of blockchain blocks that are stored in the bridge device using the second set of threads of the bridge device includes: determining whether the check height value is less than the local height value; and in response to determining that the check height value is less than the local height value, verifying a blockchain block that is stored in the bridge device and that has not been verified by the bridge device.

In some embodiments, verifying the blockchain block that is stored in the bridge device and that has not been verified by the bridge device includes determining a consistency between one or more blockchain transactions in the blockchain block and a transaction request.

In some embodiments, the method further includes: in response to verifying the blockchain block that is stored on the bridge device and that has not been verified by the bridge device, determining that the blockchain block is trustworthy; and updating the check height value by the bridge device.

In some embodiments, the method further includes: in response to determining that the check height value is not less than the local height value, refraining from verifying blockchain blocks that are stored in the bridge device.

In some embodiments, the method further includes: detecting a system fault in a system comprising the bridge device and the blockchain network node by the bridge device; and in response to detecting the system fault, performing a recovery process based on the check height value. Performing the recovery process comprises: setting the local height value equal to the check height value; and in response to determining that the local height value is less than a remote height value that indicates a number of blockchain blocks that are stored on the blockchain network node, obtaining at least one blockchain block that is not stored on the bridge device from the blockchain network node.

It is appreciated that methods in accordance with this specification may include any combination of the embodiments and features described herein. That is, methods in accordance with this specification are not limited to the combinations of embodiments and features specifically described herein, but also include any combination of the embodiments and features provided.

The details of one or more embodiments of this specification are set forth in the accompanying drawings and the description below. Other features and advantages of this specification will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
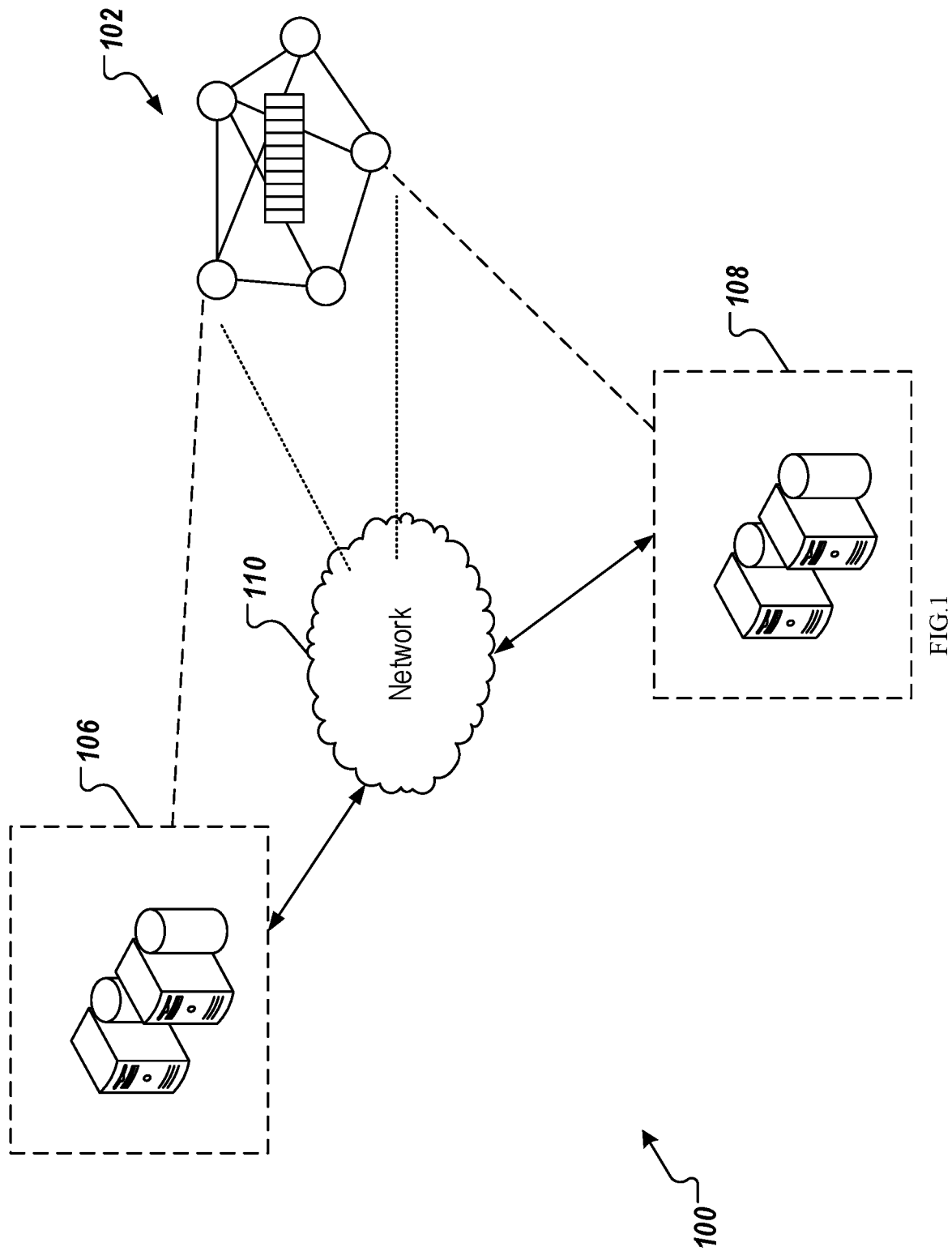
FIG. 1 is a diagram illustrating an example of an environment that can be used to execute embodiments of this specification.

This specification describes technologies for asynchronous processing of blockchain blocks, for example, for implementing a blockchain-based fault-tolerant system. These technologies generally involve connecting blockchain systems and third-party systems using a bridge device, for example, to achieve coordinated processing and control capabilities.

The techniques described in this specification produce several technical effects. In some embodiments, the bridge device is communicatively linked (e.g., through one or more of a wired or wireless communication channel) to a client device and a blockchain network node of a blockchain network. In some embodiments, the bridge device can help the client device retrieve blockchain blocks from the blockchain network node. As such, the client device can store, verify, and otherwise process the retrieved blockchain blocks locally, and be synchronized with the blockchain blocks stored in a blockchain in the blockchain network.

In some embodiments, the bridge device can provide improved throughput and processing efficiency while achieving coordinated processing of the client device, the bridge device, and the blockchain network. For example, the bridge device can be designed to enable asynchronous processing for performing its functionalities such as bridging communications between a client device and a blockchain network, obtaining blockchain blocks from the blockchain network, and verifying the obtained blockchain blocks at the bridge device, etc. For example, the bridge device can reduce processing dependency between a verification operation and a retrieval operation of blockchain blocks by introducing and maintaining cursor values associated with blockchain blocks processed by the system. As a result, the bridge device can decouple these operations and perform them asynchronously without the proceeding delay in waiting for the retrieval operation to complete.

In some embodiments, the bridge device can leverage multi-thread processing capability to use different threads to asynchronously perform its functionalities. Performing the functionalities of the bridge device asynchronously using one or more independent threads of the bridge device can improve the processing speed and flexibility of the bridge device, and increase throughput of communications between the client device and the blockchain network node, while maintaining ordered execution of block-related processing to enhance data security and trustworthiness of data stored by the bridge device and communicated between the client device and the blockchain network node.

In some embodiments, the bridge device can provide fault tolerance to the overall system by mitigating impacts of abnormalities in the blockchain-based fault-tolerant system caused by a system failure or fault. In some instances, due to the system failure or fault (e.g., a communications connection may be lost between devices of the blockchain system), blockchain data (e.g., blockchain blocks) that are stored in the blockchain system (e.g., the client device and the bridge device) are susceptive of errors or lose. The bridge device can help restore blockchain blocks in an orderly fashion, for example, by performing its functionalities according to the cursor values associated with blockchain blocks processed by the system. Accordingly, the bridge device can provide fault tolerance to ensure trustworthiness of blockchain blocks stored by the bridge device and communicated between the client device and the blockchain network node.

To provide further context for embodiments of this specification, and as introduced above, distributed ledger systems (DLSs), which can also be referred to as consensus networks (e.g., made up of peer-to-peer nodes), and blockchain networks, enable participating entities to securely, and immutably conduct transactions, and store data. Although the term blockchain is generally associated with particular networks, and/or use cases, blockchain is used herein to generally refer to a DLS without reference to any particular use case.

A blockchain is a data structure that stores transactions in a way that the transactions are immutable. Thus, transactions recorded on a blockchain are reliable and trustworthy. A blockchain includes one or more blocks. Each block in the chain is linked to a previous block immediately before it in the chain by including a cryptographic hash of the previous block. Each block also includes a timestamp, its own cryptographic hash, and one or more transactions. The transactions, which have already been verified by the nodes of the blockchain network, are hashed and encoded into a Merkle tree. A Merkle tree is a data structure in which data at the leaf nodes of the tree is hashed, and all hashes in each branch of the tree are concatenated at the root of the branch. This process continues up the tree to the root of the entire tree, which stores a hash that is representative of all data in the tree. A hash purporting to be of a transaction stored in the tree can be quickly verified by determining whether it is consistent with the structure of the tree.

Whereas a blockchain is a decentralized or at least partially decentralized data structure for storing transactions, a blockchain network is a network of computing nodes that manage, update, and maintain one or more blockchains by broadcasting, verifying and validating transactions, etc. As introduced above, a blockchain network can be provided as a public blockchain network, a private blockchain network, or a consortium blockchain network. Embodiments of this specification are described in further detail herein with reference to a consortium blockchain network. It is contemplated, however, that embodiments of this specification can be realized in any appropriate type of blockchain network.

In general, a consortium blockchain network is private among the participating entities. In a consortium blockchain network, the consensus process is controlled by an authorized set of nodes, which can be referred to as consensus nodes, one or more consensus nodes being operated by a respective entity (e.g., a financial institution, insurance company). For example, a consortium of ten (10) entities (e.g., financial institutions, insurance companies) can operate a consortium blockchain network, each of which operates at least one node in the consortium blockchain network.

In some examples, within a consortium blockchain network, a global blockchain is provided as a blockchain that is replicated across all nodes. That is, all consensus nodes are in perfect state consensus with respect to the global blockchain. To achieve consensus (e.g., agreement to the addition of a block to a blockchain), a consensus protocol is implemented within the consortium blockchain network. For example, the consortium blockchain network can implement a practical Byzantine fault tolerance (PBFT) consensus, described in further detail below.

FIG. 1 is a diagram illustrating an example of an environment 100 that can be used to execute embodiments of this specification. In some examples, the environment 100 enables entities to participate in a consortium blockchain network 102. The environment 100 includes computing devices 106, 108, and a network 110. In some examples, the network 110 includes a local area network (LAN), wide area network (WAN), the Internet, or a combination thereof, and connects web sites, user devices (e.g., computing devices), and back-end systems. In some examples, the network 110 can be accessed over a wired and/or a wireless communications link. In some examples, the network 110 enables communication with, and within the consortium blockchain network 102. In general the network 110 represents one or more communication networks. In some cases, the computing devices 106, 108 can be nodes of a cloud computing system (not shown), or each computing device 106, 108 can be a separate cloud computing system including a number of computers interconnected by a network and functioning as a distributed processing system.

In the depicted example, the computing devices 106, 108 can each include any appropriate computing system that enables participation as a node in the consortium blockchain network 102. Examples of computing devices include, without limitation, a server, a desktop computer, a laptop computer, a tablet computing device, and a smartphone. In some examples, the computing devices 106, 108 host one or more computer-implemented services for interacting with the consortium blockchain network 102. For example, the computing device 106 can host computer-implemented services of a first entity (e.g., user A), such as a transaction management system that the first entity uses to manage its transactions with one or more other entities (e.g., other users). The computing device 108 can host computer-implemented services of a second entity (e.g., user B), such as a transaction management system that the second entity uses to manage its transactions with one or more other entities (e.g., other users). In the example of FIG. 1, the consortium blockchain network 102 is represented as a peer-to-peer network of nodes, and the computing devices 106, 108 provide nodes of the first entity, and second entity respectively, which participate in the consortium blockchain network 102.

Figure 2:
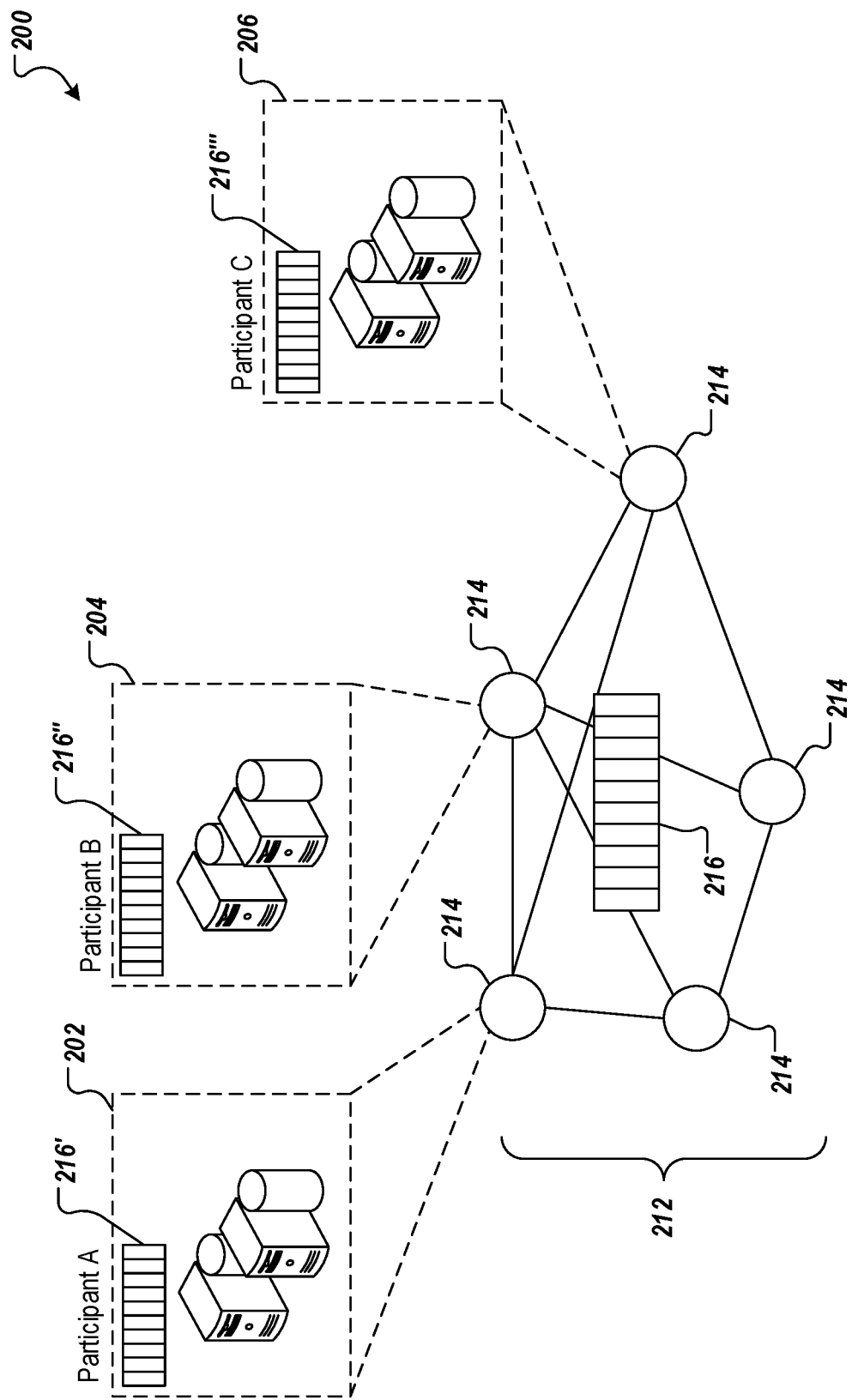
FIG. 2 is a diagram illustrating an example of an architecture in accordance with embodiments of this specification.

FIG. 2 is a diagram illustrating an example of an architecture 200 in accordance with embodiments of the specification. The example conceptual architecture 200 includes participant systems 202, 204, 206 that correspond to Participant A, Participant B, and Participant C, respectively. Each participant (e.g., user, enterprise) participates in a blockchain network 212 provided as a peer-to-peer network including a plurality of nodes 214, at least some of which immutably record information in a blockchain 216. Although a single blockchain 216 is schematically depicted within the blockchain network 212, multiple copies of the blockchain 216 are provided, and are maintained across the blockchain network 212, as described in further detail herein.

In the depicted example, each participant system 202, 204, 206 is provided by, or on behalf of Participant A, Participant B, and Participant C, respectively, and functions as a respective node 214 within the blockchain network. As used herein, a node generally refers to an individual system (e.g., computer, server) that is connected to the blockchain network 212, and enables a respective participant to participate in the blockchain network. In the example of FIG. 2, a participant corresponds to each node 214. It is contemplated, however, that a participant can operate multiple nodes 214 within the blockchain network 212, and/or multiple participants can share a node 214. In some examples, the participant systems 202, 204, 206 communicate with, or through the blockchain network 212 using a protocol (e.g., hypertext transfer protocol secure (HTTPS)), and/or using remote procedure calls (RPCs).

Nodes 214 can have varying degrees of participation within the blockchain network 212. For example, some nodes 214 can participate in the consensus process (e.g., as miner nodes that add blocks to the blockchain 216), while other nodes 214 do not participate in the consensus process. As another example, some nodes 214 store a complete copy of the blockchain 216, while other nodes 214 only store copies of portions of the blockchain 216. For example, data access privileges can limit the blockchain data that a respective participant stores within its respective system. In the example of FIG. 2, the participant systems 202, 204, and 206 store respective, complete copies 216', 216", and 216''' of the blockchain 216.

A blockchain (e.g., the blockchain 216 of FIG. 2) is made up of a chain of blocks, each block storing data. Examples of data include transaction data representative of a transaction between two or more participants. While transactions are used herein by way of non-limiting example, it is contemplated that any appropriate data can be stored in a blockchain (e.g., documents, images, videos, audio). Examples of a transaction can include, without limitation, exchanges of something of value (e.g., assets, products, services, currency). The transaction data is immutably stored within the blockchain. That is, the transaction data cannot be changed.

Before storing in a block, the transaction data is hashed. Hashing is a process of transforming the transaction data (provided as string data) into a fixed-length hash value (also provided as string data). It is not possible to un-hash the hash value to obtain the transaction data. Hashing ensures that even a slight change in the transaction data results in a completely different hash value. Further, and as noted above, the hash value is of fixed length. That is, no matter the size of the transaction data the length of the hash value is fixed. Hashing includes processing the transaction data through a hash function to generate the hash value. An example of a hash function includes, without limitation, the secure hash algorithm (SHA)-256, which outputs 256-bit hash values.

Transaction data of multiple transactions are hashed and stored in a block. For example, hash values of two transactions are provided, and are themselves hashed to provide another hash. This process is repeated until, for all transactions to be stored in a block, a single hash value is provided. This hash value is referred to as a Merkle root hash, and is stored in a header of the block. A change in any of the transactions will result in change in its hash value, and ultimately, a change in the Merkle root hash.

Blocks are added to the blockchain through a consensus protocol. Multiple nodes within the blockchain network participate in the consensus protocol, and perform work to have a block added to the blockchain. Such nodes are referred to as consensus nodes. PBFT, introduced above, is used as a non-limiting example of a consensus protocol. The consensus nodes execute the consensus protocol to add transactions to the blockchain, and update the overall state of the blockchain network.

In further detail, the consensus node generates a block header, hashes all of the transactions in the block, and combines the hash value in pairs to generate further hash values until a single hash value is provided for all transactions in the block (the Merkle root hash). This hash is added to the block header. The consensus node also determines the hash value of the most recent block in the blockchain (i.e., the last block added to the blockchain). The consensus node also adds a nonce value, and a timestamp to the block header.

In general, PBFT provides a practical Byzantine state machine replication that tolerates Byzantine faults (e.g., malfunctioning nodes, malicious nodes). This is achieved in PBFT by assuming that faults will occur (e.g., assuming the existence of independent node failures, and/or manipulated messages sent by consensus nodes). In PBFT, the consensus nodes are provided in a sequence that includes a primary consensus node, and backup consensus nodes. The primary consensus node is periodically changed, Transactions are added to the blockchain by all consensus nodes within the blockchain network reaching an agreement as to the world state of the blockchain network. In this process, messages are transmitted between consensus nodes, and each consensus nodes proves that a message is received from a specified peer node, and verifies that the message was not modified during transmission.

In PBFT, the consensus protocol is provided in multiple phases with all consensus nodes beginning in the same state. To begin, a client sends a request to the primary consensus node to invoke a service operation (e.g., execute a transaction within the blockchain network). In response to receiving the request, the primary consensus node multicasts the request to the backup consensus nodes. The backup consensus nodes execute the request, and each sends a reply to the client. The client waits until a threshold number of replies are received. In some examples, the client waits for f+1 replies to be received, where f is the maximum number of faulty consensus nodes that can be tolerated within the blockchain network. The final result is that a sufficient number of consensus nodes come to an agreement on the order of the record that is to be added to the blockchain, and the record is either accepted, or rejected.

In some blockchain networks, cryptography is implemented to maintain privacy of transactions. For example, if two nodes want to keep a transaction private, such that other nodes in the blockchain network cannot discern details of the transaction, the nodes can encrypt the transaction data. An example of cryptography includes, without limitation, symmetric encryption, and asymmetric encryption. Symmetric encryption refers to an encryption process that uses a single key for both encryption (generating ciphertext from plaintext), and decryption (generating plaintext from ciphertext). In symmetric encryption, the same key is available to multiple nodes, so each node can en-/de-crypt transaction data.

Asymmetric encryption uses keys pairs that each include a private key, and a public key, the private key being known only to a respective node, and the public key being known to any or all other nodes in the blockchain network. A node can use the public key of another node to encrypt data, and the encrypted data can be decrypted using other node's private key. For example, and referring again to FIG. 2, Participant A can use Participant B's public key to encrypt data, and send the encrypted data to Participant B. Participant B can use its private key to decrypt the encrypted data (ciphertext) and extract the original data (plaintext). Messages encrypted with a node's public key can only be decrypted using the node's private key.

Asymmetric encryption is used to provide digital signatures, which enables participants in a transaction to confirm other participants in the transaction, as well as the validity of the transaction. For example, a node can digitally sign a message, and another node can confirm that the message was sent by the node based on the digital signature of Participant A. Digital signatures can also be used to ensure that messages are not tampered with in transit. For example, and again referencing FIG. 2, Participant A is to send a message to Participant B. Participant A generates a hash of the message, and then, using its private key, encrypts the hash to provide a digital signature as the encrypted hash. Participant A appends the digital signature to the message, and sends the message with digital signature to Participant B. Participant B decrypts the digital signature using the public key of Participant A, and extracts the hash. Participant B hashes the message and compares the hashes. If the hashes are same, Participant B can confirm that the message was indeed from Participant A, and was not tampered with.

Figure 3:
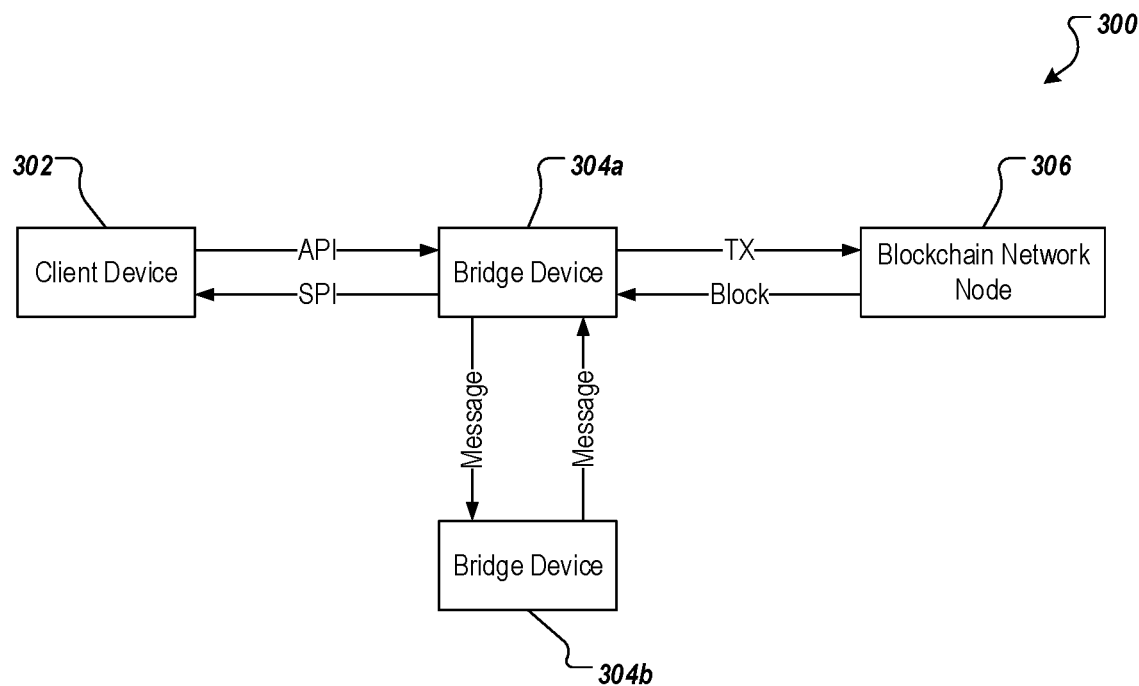
FIG. 3 is a diagram illustrating an example of a blockchain-based fault-tolerant system in accordance with embodiments of this specification.

FIG. 3 is a diagram illustrating an example of a system 300 in accordance with embodiments of this specification. The system 300 implements a blockchain-based fault-tolerant system. As shown, the system 300 includes a client device 302, bridge devices 304a-b, and a blockchain network node 306.

The client device 302 can include, for example, any suitable computer, module, server, or computing element programmed to perform methods described herein. In some embodiments, the client device 302 can be a digital wallet device or system that includes an electronic device or online service that allows an individual to make electronic transactions over a computer network. For example, the individual's bank account can be linked to the digital wallet device. Other identity information, such as driver's licenses, health care cards, and cryptographic keys, can be also stored on the digital wallet device.

In some embodiments, the client device 302 can include an interface that allows a bridge device (e.g., bridge device 304a) to communicate with the client device 302. In some embodiments, the interface of the client device 302 can be a service provider interface (SPI) that can be implemented and/or extended by the client device 302 and that can allow a bridge device (e.g., bridge device 304a) to send data to the client device 302. In some embodiments, the SPI can include a set of public interfaces and abstract classes that the bridge device defines. In some embodiments, the SPI can specify a standard or protocol that the client device 302 needs to conform to for achieving a goal. In some embodiments, the client device 302 can send a transaction request (e.g., a request of fund transfer) to the bridge device and receive a request result from the bridge device via the SPI of the client device 302.

The bridge devices 304a-b can include, for example, any suitable computer, module, server, or computing element programmed to perform methods described herein. In general, the bridge devices 304a-b provide bridging functionalities to enable communications between third-party systems (e.g., client device 302) and blockchain systems (e.g., blockchain network node 306). In some examples, the bridge devices 304a-b can be proxy servers that act as intermediaries for handling requests from the client device 302 seeking resources (e.g., blockchain data) from the blockchain network node 306. As shown, the bridge device 304a is communicatively linked (e.g., through one or more of a wired or wireless communication channel) to the client device 302 and the blockchain network node 306. In some embodiments, the bridge device can be implemented as a component or module of the client device 302.

In some embodiments, a bridge device (e.g., bridge device 304a) can include an interface that allows the client device 302 to communicate with the bridge device and further access to a blockchain network. In some embodiments, the interface of the bridge device 304a can include an application programming interface (API) that is exposed to the client device 302 and can be used by the client device 302 to communicate with the bridge device 304a and further access to the blockchain network via the blockchain network node 306. The API of the bridge device can include a set of subroutines, communications protocols, and methods that the client device 302 can access. In some embodiments, a bridge device (e.g., bridge device 304a) can receive a transaction request from the client device 302 via the API of the bridge device, and provide a request response to the client device 302 via the SPI of the client device 302.

In some embodiments, the system 300 includes multiple bridge devices 304a-b, and the bridge devices 304a-b can communicate with each other by conforming to a predefined communications protocol. In some embodiments, each of the bridge devices 304a-b can be communicatively linked to a respective blockchain network node. As shown, bridge device 304a is communicatively linked to the blockchain network node 306.

In some embodiments, the blockchain network node 306 can be a consensus node or a non-consensus node of a blockchain network. In some embodiments, the bridge device 304b can be linked to another blockchain network node (not shown) of the blockchain network. In some embodiments, each of the bridge devices 304a-b can convert a transaction request from the client device 302 to a blockchain transaction and submit the blockchain transaction to a communicatively linked blockchain network node. For example, a bridge device (e.g., bridge device 304a) can make a contract call to a smart contract to be executed on the blockchain network node 306 to generate a blockchain transaction based on a transaction request from the client device 302.

In some embodiments, each of the bridge devices 304a-b can retrieve blockchain blocks from a linked blockchain network node. In some embodiments, a bridge device (e.g., bridge device 304a) can receive blockchain blocks that are pushed by the blockchain network nodes (e.g., blockchain network node 306) to the bridge device. For example, the blockchain network node 306 can push blockchain blocks periodically to the bridge device 304a based on a subscription of the bridge device 304a. In some embodiments, a bridge device (e.g., bridge device 304a) can pull blockchain blocks from the blockchain network nodes (e.g., blockchain network node 306), for example, on demand. For example, the bridge device 304a can request blockchain blocks from the blockchain network node 306 periodically or from time to time.

In some embodiments, the bridge devices 304a-b can verify the blockchain blocks retrieved from the blockchain network nodes to determine whether the blockchain blocks are trustworthy. In some embodiments, a bridge device can verify the blockchain blocks by comparing transaction data recorded in the blockchain blocks to the data included in the transaction request that is sent by the client device to the bridge device. In some embodiments, the bridge device can verify a blockchain block based on a hash value of the blockchain transactions in the blockchain block. For example, the blockchain block can include a blockchain transaction and a first hash value of the blockchain transaction. The bridge device can obtain the blockchain transaction from the blockchain block and compute a second hash value of the blockchain transaction. The bridge device can compare the second hash value with the first hash value. If it is determined that the two hash values match, the bridge device can determine that the blockchain transaction in the blockchain block has not been tampered with and that the blockchain block is a trusted block.

In some embodiments, a bridge device can maintain three cursor values associated with the blockchain blocks processed by the system. In some embodiments, these cursor values are implemented as three counters and stored in a data store (e.g., memory) of the bridge device. In some embodiments, the three cursor values include a first value indicating a number of blockchain blocks that are stored on the blockchain network node (e.g., blockchain network node 306), a second value indicating a number of blockchain blocks that are stored on the bridge device (e.g., bridge device 304a), and a third value indicating a number of blockchain blocks that have been verified by the bridge device.

Figure 4:
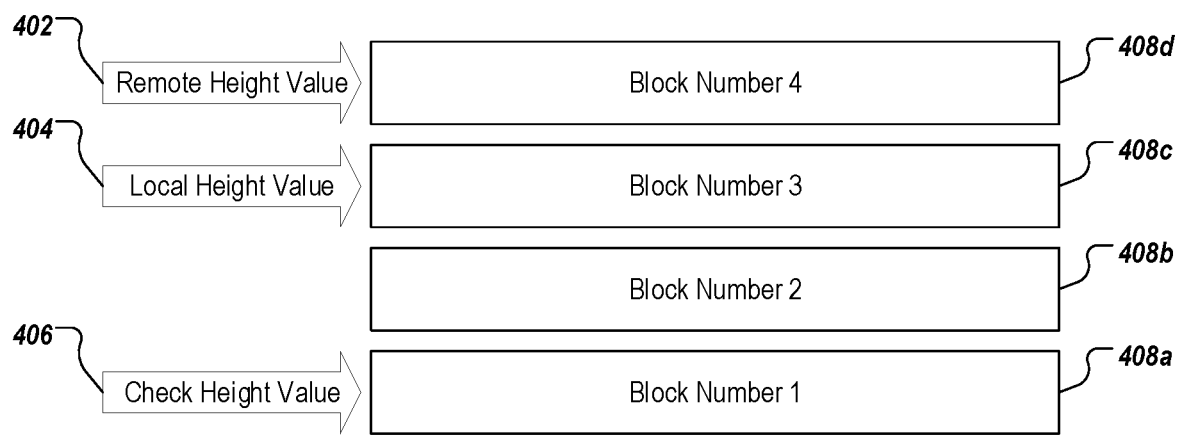
FIG. 4 is a diagram illustrating examples of cursor values stored in the blockchain-based fault-tolerant system of FIG. 3 in accordance with embodiments of this specification.

FIG. 4 is a diagram 400 illustrating examples of cursor values stored in the blockchain-based fault-tolerant system of FIG. 3 in accordance with embodiments of this specification. As shown, a bridge device (e.g., bridge device 304a) can maintain a remote height value 402 indicating a number of blockchain blocks that are stored on a communicatively linked blockchain network node (e.g., blockchain blocks 408a-d), a local height value 404 indicating a number of blockchain blocks that are stored on the bridge device (e.g., blockchain blocks 408a-c), and a check height value 406 indicating a number of blockchain blocks that have been verified by the bridge device (e.g., blockchain block 408a).

In some embodiments, the bridge device can receive a notification indicating the remote height value 402 from the blockchain network node. In some embodiments, the notification can include the remote height value 402 indicating a total number of blockchain blocks that are stored on the blockchain network node. In some embodiments, the notification can include a new block notification that indicates a new block has been added to a blockchain of the blockchain network node. For example, the new block notification can indicate that the remote height value 402 has increased by 1.

In some embodiments, the bridge device can determine whether the local height value 404 is less than the remote height value 402. In some embodiments, if it is determined that the local height value 404 is less than the remote height value 402, the bridge device can retrieve blockchain blocks from the blockchain network node. In some embodiments, the bridge device can retrieve one or more blockchain blocks from the blockchain network node that have not been stored on the bridge device 304a. For example, referring to FIG. 4, the bridge device can determine that blockchain blocks 408a-c are stored on the bridge device and that the local height value 404 is less than the remote height value 402 by one. In response to the determination, the bridge device can retrieve the blockchain block 408d from the blockchain network node. In some embodiments, the bridge device can retrieve the blockchain blocks from the blockchain network node, for example, in a pull or push mode as previously described. In some embodiments, the bridge device can update the local height value 404 after retrieving blockchain blocks from the blockchain network node. For example, if the bridge device obtains one blockchain block from the blockchain network node, the bridge device can update the local height value 404 by increasing it by 1. In some embodiments, the bridge device can keep retrieving the blockchain blocks from the blockchain network node and updating the local height value 404 until the local height value 404 equals the remote height value 402.

In some embodiments, if it is determined that the local height value 404 is not less than the remote height value 402, the bridge device can stop or refrain from retrieving blockchain blocks from the blockchain network node. For example, if the local height value 404 equals the remote height value 402, the bridge device can refrain from retrieving blockchain blocks from the blockchain network node.

In some embodiments, the bridge device can determine whether the check height value 406 is less than the local height value 404. If it is determined that the check height value 406 is less than the local height value 404, the bridge device can verify a blockchain block that is stored on the bridge device and that has not been verified by the bridge device. For example, referring to FIG. 4, the bridge device can determine that the blockchain block 408a has been verified and that the check height value 406 is less than the local height value 404 by two. In response to the determination, the bridge device can continue to verify the blockchain blocks 408b-c.

In some embodiments, the bridge device verifies the blockchain blocks to determine whether the blockchain blocks are trustworthy. In some embodiments, the bridge device verifies the blockchain blocks by comparing transaction data recorded in the blockchain blocks to the data included in the transaction request that is sent by the client to the bridge device. For example, a client device (e.g., client device 302 of FIG. 3) can send a transaction request to the bridge device (e.g., bridge device 304a of FIG. 3) where the transaction request identifies a fund transfer of a certain amount from one account to another. The bridge device can identify a blockchain block that is stored on the bridge device and that includes blockchain transactions related to the fund transfer. The bridge device can compare the blockchain transaction related to the fund transfer in the blockchain block to the data included in the transaction request. The bridge device can determine whether the data related to the amount of transferred fund and the account information in the blockchain transaction match the data in the transaction request. If it is determined that there is a data match, the bridge device can determine that the verified blockchain block is a trusted block.

In some embodiments, the bridge device can verify a blockchain block based on a hash value of the blockchain transactions in the blockchain block. For example, the blockchain block can record a blockchain transaction and a first hash value of the blockchain transaction. The bridge device can obtain the blockchain transaction and compute a second hash value of the blockchain transaction. The bridge device can compare the second hash value with the first hash value. If it is determined that the two hash values match, the bridge device can determine that the blockchain transaction in the blockchain block has not been tampered with and that the blockchain block is a trusted block.

In some embodiments, after verifying the blockchain blocks, the bridge device can update the check height value 406. For example, after the bridge device verifies that the blockchain block 408b is a trusted block, the bridge device can increase the check height value 406 by 1. In some embodiments, the bridge device can keep verifying the blockchain blocks that are stored on the bridge device and updating the check height value 406 until the check height value 406 equals the local height value 404.

In some embodiments, if it is determined that the check height value 406 is not less than the local height value 404, the bridge device can stop or refrain from verifying blockchain blocks. For example, if the check height value 406 equals the local height value 404, the bridge device can refrain from verifying blockchain blocks that are stored on the bridge device.

In some embodiments, a system error, abnormality, failure or fault can occur. For example, a communications connection may be lost between the bridge device and the blockchain network node. In some examples, the blockchain blocks that are stored on the bridge device can be lost due to the system failure or fault. In some embodiments, in response to detecting the system failure or fault, the bridge device can perform a recovery process. In some embodiments, the bridge device can perform the recovery process based on the check height value 406. For example, the bridge device can set the local height value 404 to the check height value 406. Because the check height value 406 indicates a total number of blockchain blocks that have been verified by the bridge device, these blockchain blocks, even if being lost, do not necessarily need to be re-obtained by the bridge device. However, any blockchain blocks numbered subsequent to the check height value 406 and precedent to the local height value 404 have been obtained but not been verified. These blockchain blocks are susceptive of errors or lose, for example, due to the system failure or fault. So the local height value 404 is set (or reduced) to the check height value 406 in order for the bridge device to re-obtain the unverified blockchain blocks from the blockchain network node for verification. For example, after setting the local height value 404 to the check height value 406, the bridge device can compare the local height value 404 to the remote height value 402 and determine whether the local height value 404 is less than the remote height value 402. If it is determined that the local height value 404 is less than the remote height value 402, the bridge device can re-obtain the unverified blockchain blocks from the blockchain network node.

In some embodiments, the bridge device can perform asynchronous processing to improve the efficiency and throughput of the overall system. Asynchronous processing is a way of executing two or more operations without imposing a processing dependency or temporal order between the two or more operations. In asynchronous processing, a pending task can be allowed to start before a running task is completed. In other words, when two operations are performed asynchronously, execution of one operation will not block or suspend execution of the other operation. One operation can start without waiting for the other operation to complete and both operations can be executing simultaneously. Thus, when two operations are being processed asynchronously, the determination of when to begin executing one operation is independent of, i.e., does not depend on, the current state of the execution of the other operation.

In some embodiments, asynchronous processing enables various workflow processes to run at the same time. For example, in asynchronous processing, operations such as requests and replies are transmitted on different sessions. No processing dependency exists between a request and a reply, and no assumptions are made about the timing of the reply. Unlike a synchronous operation that blocks or suspends a process till the operation completes, an asynchronous operation is non-blocking and initiates the operation without blocking or suspending the process. Compared to synchronous processing where a pending task is started after a running task is completed, in asynchronous processing, a pending task can be allowed to start before a running task is completed.

In some embodiments, the bridge device can perform asynchronous processing in retrieving blockchain blocks from the blockchain network node and verifying blockchain blocks that are stored in the bridge device. In some embodiments, by introducing and monitoring the three cursor values to regulate or otherwise control the processing, the bridge device, the verifying operation can be performed asynchronously with the retrieving operation, thus relieving the bridge from waiting for the retrieving operation to complete. For example, the verifying operation can be performed relatively independently with respective to the retrieving operation, as long as respective conditions of the cursor values are met. For example, the verifying operation can be performed if the check height value is less than the local height value, and the retrieving operation can be performed if the local height value is less than the remote height value. By relieving the processing dependency between the two operations, the bridge device can decouple the two operations and execute the two operations with improved efficiency and improve the system throughput.

In some embodiments, the bridge device can leverage multi-thread processing capability to use one or more independent threads for performing functionalities of the bridge device. A thread is generally an execution context that includes the information that a processor needs to execute a stream of instructions. For example, a thread can include a sequence of programmed instructions and is designed to be scheduled and executed by a processor independently of a parent process. While allowing multiple threads to exist within the context of one process, multithreading can also allow the threads to share the process's resources and execute independently. For example, multiple threads can exist within one process, executing concurrently and sharing resources such as memory. The threads of a process share its executable code and the values of its dynamically allocated variables and non-thread-local global variables at any given time. Multithreading is an example way to enable asynchronous processing and parallel execution.

In some embodiments, the bridge device can perform asynchronous operation and parallel execution using the different sets of threads to perform the retrieving and verifying the blockchain blocks separately, which can improve the efficiency and throughput of the overall system. As an example of implementation, the bridge device can retrieve a first set of blockchain blocks from the blockchain network node using a first set of threads of the bridge device. The first set of threads can include multiple threads that each can be used to independently retrieve one blockchain block of the first set of blockchain blocks from the blockchain network node. The bridge device can verify a second set of blockchain blocks that are stored in the bridge device using a second set of threads of the bridge device. The second set of threads can include multiple threads that each can be used to independently verify one blockchain block of the second set of blockchain blocks that are stored in the bridge device.

As another example, the bridge device can use a first thread for bridging communications between a client device and a blockchain network. As a specific example, a bridge device (e.g., bridge device 304a of FIG. 3) can use a first thread for receiving a transaction request from a client device (e.g., client device 302 of FIG. 3), submitting the transaction request to a blockchain network node (e.g., blockchain network node 306 of FIG. 3), and receiving a notification of an execution result from the blockchain network node that may execute the transaction. In some embodiments, the bridge device can use a second thread for obtaining one or more blockchain blocks from the blockchain network. In some embodiments, the bridge device can use a third thread for verifying the obtained blockchain blocks at the bridge device. In some embodiments, the bridge device can use additional or different threads and allocate different tasks to the multiple threads. In some embodiments, the one or more independent threads can be executed by one or more processors of the bridge device independently or in parallel.

In some embodiments, the one or more independent threads can access and/or update the three cursor values to regulate or otherwise control the processing the bridge device and communications between the client device and the blockchain network. In some embodiments, some threads can be authorized to access but not to update each of the three cursor values.

For example, in some embodiments, the first thread can be used to update a remote height value 402, for example, based on a notification (e.g., a new block notification) received from the blockchain network node. Other threads can be authorized to access but not to update the remote height value 402. For example, before obtaining one or more blockchain blocks from the blockchain network, the second thread can obtain remote height value 402, compare a local height value 404 with the remote height value 402, and determine whether the local height value 404 is less than the remote height value 402. The second thread can obtain one or more blockchain blocks from the blockchain network if the local height value 404 is less than the remote height value 402. In some embodiments, the second thread can be used to update the local height value 404, whereas other threads can be authorized to access but not to update the local height value 404. For example, in some embodiments, before verifying the obtained blockchain blocks at the bridge device, the bridge device can use the third thread to access local height value 404, compare a check height value 406 with the local height value 404, and determine whether the check height value 406 is less than the local height value 404. The third thread will proceed to verify the obtained blockchain blocks at the bridge device if the check height value 406 is less than the local height value 404. In some embodiments, the third thread can be used to update the check height value 406, whereas other threads can be authorized to access but not to update the check height value 406.

Figure 5:
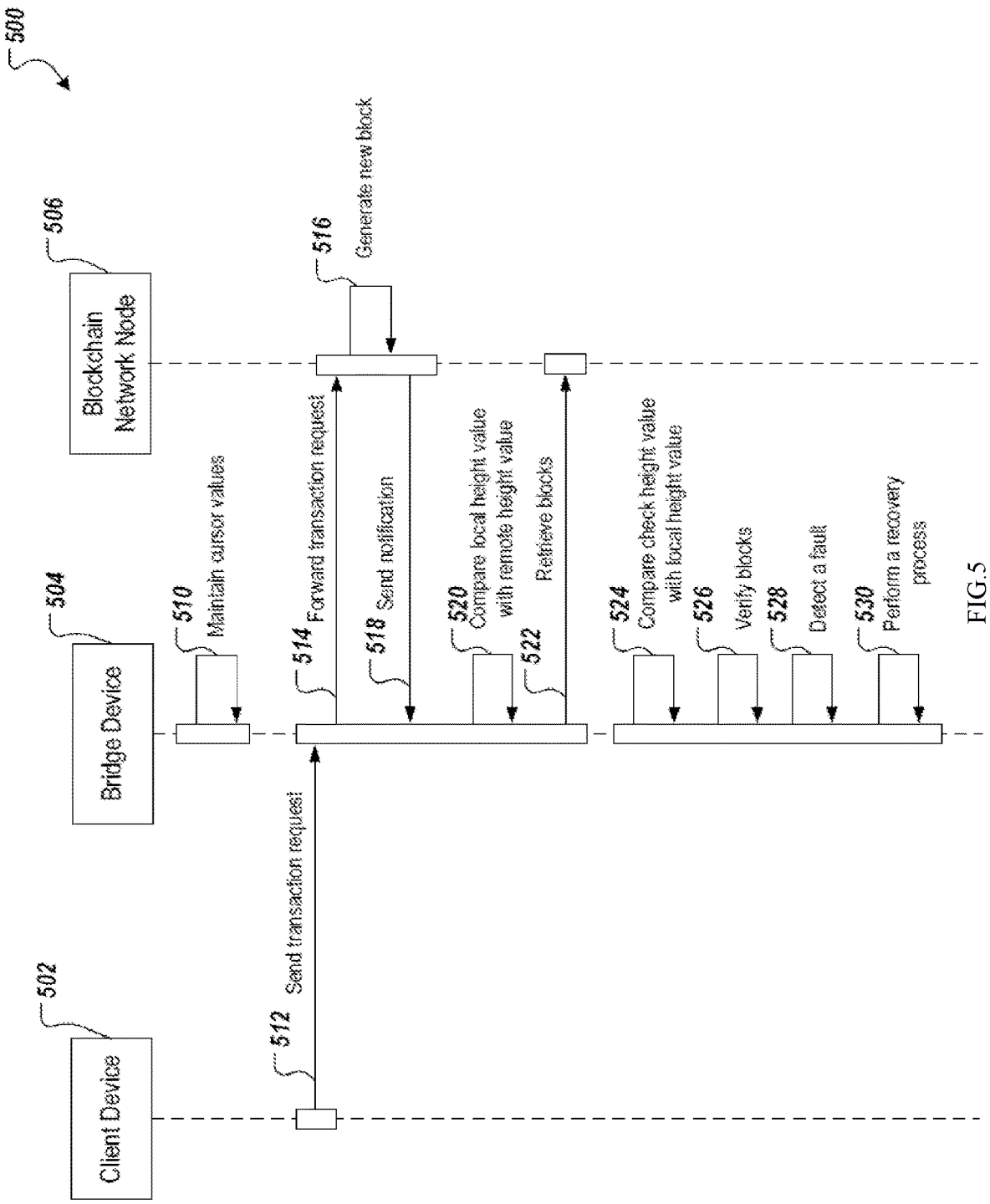
FIG. 5 is a signal flow illustrating an example of a process that can be executed in accordance with embodiments of this specification.

FIG. 5 is a signal flow illustrating an example of a process 500 that can be executed in accordance with embodiments of this specification. The signal flow represents a process 500 for asynchronous processing of blockchain blocks, which can be used, for example, for implementing a blockchain-based fault-tolerant system. For convenience, the process will be described as being performed by a system of one or more computers, located in one or more locations, and programmed appropriately in accordance with this specification. For example, a blockchain data processing system (e.g., the system 300 of FIG. 3), appropriately programmed, can perform the process.

At 510, a bridge device 504 (e.g., bridge device 304a of FIG. 3) maintains three cursor values in a data store (e.g., a memory) of the bridge device 504. For example, the bridge device 504 can maintain the three cursor values as three counters. In some embodiments, maintaining the three cursor values can include storing and updating the three cursor values. In some embodiments, the three cursor values can include a remote height value (e.g., remote height value 402 of FIG. 4) indicating a number of blockchain blocks that are stored on a blockchain network node 506 (e.g., the blockchain network node 306 of FIG. 3), a local height value (e.g., the local height value 404 of FIG. 4) indicating a number of blockchain blocks that are stored on the bridge device 504, and a check height value (e.g., the check height value 406 of FIG. 4) indicating a number of blockchain blocks that have been verified by the bridge device 504.

At 512, a client device 502 (e.g., the client device 302 of FIG. 3) sends a transaction request to the bridge device 504. For example, the client device 502 can send a fund transfer request to the bridge device 504 using an API of the bridge device 504. The fund transfer request can identify an amount of fund to be transferred from a first account (e.g., a blockchain account associated with the client device 502) to a second account (e.g., a blockchain account associated with another client device).

At 514, the bridge device 504 forwards the transaction request to the blockchain network node 506. For example, the bridge device 504 can make a contract call to a smart contract executing on the blockchain network node 506 to submit the transaction request as a blockchain transaction to the blockchain network node 506. In some embodiments, the bridge device 504 can determine whether the client device 502 is authorized to access the blockchain network node 506. For example, the bridge device 504 can verify a digital signature of the client device 502 included in the transaction request using a public key.

At 516, after receiving the blockchain transaction from the bridge device 504, the blockchain network node 506 may generate a new blockchain block based on the blockchain transaction. For example, the blockchain network node 506 can initiate a consensus procedure (e.g., PBFT consensus) on the blockchain transaction among a number of consensus nodes of a blockchain network. In some embodiments, after it is determined that a consensus is reached among the consensus nodes, and/or the blockchain transaction is executed, a new blockchain block can be generated and added to a blockchain stored on the blockchain network node 506.

At 518, the blockchain network node 506 sends a notification to the bridge device 504. In some embodiments, the notification can indicate a remote height value indicating a number of blockchain blocks that have been stored on the blockchain network node 506. For example, the notification can include the remote height value. As another example, the notification can include a new block notification that indicates a new block has been added to a blockchain of the blockchain network node 506.

In some embodiments, the bridge device 504 can receive the notification from the blockchain network node 506 in a push or pull mode. For example, the bridge device 504 or the client device 502 can subscribe to blockchain blocks of the blockchain network node 506, and the blockchain network node 506 can push the notification to the bridge device 504 based on the subscription periodically, or dynamically after a new block is added to a blockchain of the blockchain network node 506. In some embodiments, the bridge device 504 can pull the information of the blockchain from the blockchain network node 506, for example, by sending a request for the notification to the blockchain network node 506.

At 520, after receiving the notification from the blockchain network node 506, the bridge device 504 compares the local height value with the remote height value. In some embodiments, if the notification includes the remote height value, the bridge device 504 can update the remote height value stored in the data store of the bridge device 504. In some embodiments, if the notification includes a new block notification that indicates a new block has been added to the blockchain of the blockchain network node 506, the bridge device 504 can update the stored remote height value, for example, by increasing the remote height value by 1 or another unit.

In some embodiments, the bridge device 504 determines whether the local height value is less than the remote height value. If it is determined that the local height value is less than the remote height value, the bridge device 504 can retrieve blockchain blocks from the blockchain network node 506. If it is determined that the local height value is not less than the remote height value, the bridge device 504 can refrain from retrieving blockchain blocks from the blockchain network node 506.

At 522, after determining that the local height value is less than the remote height value, the bridge device 504 retrieves one or more blockchain blocks from the blockchain network node 506. In some embodiments, the bridge device 504 can retrieve one or more blockchain blocks from blockchain network node 506 that have not been stored on the bridge device 504. For example, the bridge device 504 can retrieve one or more blockchain blocks from the blockchain network node 506, where the one or more blockchain blocks are the ones stored on the blockchain network node 506 and subsequent to the latest blockchain block that has been obtained by the bridge device 504. For example, the one or more blockchain blocks are subsequent to the latest blockchain block in the number of blockchain blocks that are indicated by the local height value. In some embodiments, the bridge device 504 can retrieve the blockchain blocks from the blockchain network node in a push or pull mode. In some embodiments, the bridge device 504 can update the local height value after retrieving blockchain blocks from the blockchain network node 506. In some embodiments, the bridge device 504 can keep retrieving the blockchain blocks from the blockchain network node 506 and updating the local height value until the local height value equals the remote height value. In some embodiments, when the local height value equals the remote height value, the bridge device 504 can stop or refrain from retrieving blockchain blocks from the blockchain network node 506.

At 524, the bridge device 504 compares the check height value with the local height value. In some embodiments, the bridge device 504 can determine whether the check height value is less than the local height value. If it is determined that the check height value is less than the local height value, the bridge device 504 can verify a blockchain block that is stored on the bridge device and that has not been verified by the bridge device 504. If it is determined that the check height value is not less than the local height value, the bridge device 504 can refrain from verifying blockchain blocks that are stored on the bridge device 504.

At 526, after determining that the check height value is less than the local height value, the bridge device 504 verifies the blockchain blocks stored on the bridge device 504 to determine whether the blockchain blocks are trustworthy. In some embodiments, the bridge device 504 verifies the blockchain blocks that are stored on the bridge device 504 and that have not been verified by the bridge device 504. For example, the bridge device 504 can verify a blockchain block subsequent to the number of blockchain blocks that have been verified by the bridge device 504 and that are indicated by the check height value. In some embodiments, the bridge device 504 can verify the blockchain blocks by comparing transaction data recorded in the blockchain blocks to the data included in the transaction request that is sent by the client device 502 to the bridge device 504. For example, the transaction request can identify a fund of a certain amount to be transferred from one blockchain account to another. The bridge device 504 can identify a blockchain block that is stored on the bridge device 504 and that includes blockchain transactions related to the fund transfer. The bridge device 504 can compare the blockchain transaction data related to the fund transfer to the data included in the transaction request. The bridge device can determine whether the data related to the amount of the transferred fund and the account information in the blockchain blocks match or are otherwise consistent with the data in the transaction request. If it is determined that they are consistent, the bridge device can determine that the verified blockchain block is a trusted blockchain block.

In some embodiments, the bridge device 504 can verify a blockchain block based on a hash value of the blockchain transactions in the blockchain block. For example, the blockchain block can include a blockchain transaction and a first hash value of the blockchain transaction. The bridge device 504 can obtain the blockchain transaction from the blockchain block and compute a second hash value of the blockchain transaction. The bridge device 504 can compare the second hash value with the first hash value. If it is determined that the two hash values match, the bridge device 504 can determine that the blockchain transaction data in the blockchain block has not been tampered with and that the blockchain block is a trusted blockchain block.

In some embodiments, after verifying the blockchain blocks, the bridge device 504 can update the check height value. For example, after the bridge device 504 verifies that a blockchain block is a trusted block, the bridge device 504 can increase the check height value, for example, by 1 or another unit. In some embodiments, the bridge device can keep verifying the blockchain blocks that are stored on the bridge device and updating the check height value until the check height value equals the local height value. In some embodiments, when the check height value equals the local height value, the bridge device 504 can refrain from verifying the blockchain blocks stored on the bridge device 504.

At 528, the bridge device 504 detects a system fault. In some embodiments, the system fault can include software bugs and errors, hard disk failures, input or output device failures, or other temporary or permanent failures. In some embodiments, the system fault causes a communications connection to be lost or interrupted between the bridge device 504 and the blockchain network node 506. In some examples, the blockchain blocks that are stored on the bridge device 504 can be compromised or lost due to a system fault. In some embodiments, the remote height values, the local height values, and the check height values are stored in a non-volatile storage medium of the bridge device 504 such that these cursor values can be retained despite of the system fault.

At 530, after detecting the system fault, the bridge device 504 performs a recovery process. In some embodiments, the bridge device 504 can perform the recovery process based on the check height value. In some embodiments, the bridge device 504 can set the local height value to the check height value. Because the check height value indicates a number of blockchain blocks that have been verified by the bridge device 504, these blockchain blocks, even if being lost, do not necessarily need to be re-obtained by the bridge device 504. However, blockchain blocks subsequent to a latest blockchain block indicated by the check height value 406 and precedent to a latest blockchain block indicated by the local height value 404 have been obtained but not been verified by the bridge device 504. These blockchain blocks are susceptive of errors or lose, for example, due to the system fault. As such, the local height value can be set (or reduced) to the check height value in order to re-obtain the unverified blockchain blocks from the blockchain network node 506 for verification. For example, after setting the local height value to the check height value, the bridge device 504 can compare the local height value to the remote height value and determine whether the local height value is less than the remote height value. If it is determined that the local height value is less than the remote height value, the bridge device 504 can re-obtain the unverified blockchain blocks from the blockchain network node 506. The bridge device 504 can continue to verify the re-obtained unverified blockchain blocks until the check height value reaches the local height value.

In some embodiments, as described above, multiple independent threads can be employed by the bridge device 504 in accessing and/updating the three cursor values, obtaining the blockchain blocks, verifying the obtained blockchain blocks, etc. In some embodiments, some operations (e.g., operations 522, 526 and 528) of the process 500 can be performed in another order or in parallel. For example, the verifying operation at 526 can be performed relatively independently with respective to the retrieving operation at 524, as long as respective conditions of the cursor values are met. For example, at a certain time instance, the verifying operation at 526 can start before the retrieving operation at 522 if it is determined that the check height value is less than the local height value. The verifying operation at 526 can be performed without waiting for the retrieving operation at 522 to complete. Similarly, the retrieving operation at 522 can start without waiting for the verifying operation at 526 to complete as long as it is determined that the local height value is less than the remote height value. The process 500 can continue and further include additional or different operations. For example, the bridge device 504 can return an execution result of the transaction request to the client device 502, for example, SPI. In some embodiments, the process 500 can include additional or different iterations of the above described process.

As described above, the bridge device 504 updates the remote height value through a new block notification received from the blockchain network node 506 to keep synchronization of the remote height value with the blockchain network. In some embodiments, the bridge device 504 continuously updates the local height value by retrieving blockchain blocks from the blockchain network node 506. In some embodiments, the bridge device 504 verifies the blockchain blocks and updates the check height value. In some embodiments, the three cursor values satisfy the following relationship: check height value local height value remote height value.

In some embodiments, the updating of the remote height value is related to the notification that the bridge device 504 receives from the blockchain network node 506. In some embodiments, the notification includes a new block notification indicating a new block has been added to a blockchain stored on the blockchain network node 506. The updating of the remote height value and the operation of the blockchain network node 506 are kept in sync such that the remote height value is continuously incremented at the bridge device 504 based on the new block notification. In some embodiments, the bridge device 504 synchronizes the blockchain blocks with the blockchain network node 506 by retrieving blockchain blocks from the blockchain network node based on a comparison between the local height value and the remote height value. In some embodiments, the blockchain blocks that have been synchronized by the bridge device 504 and stored on the bridge device 504 are indicated by the local height value. In some embodiments, the blockchain transaction data in the blockchain blocks obtained by the bridge device 504 during the block synchronization process triggers a verification process of the bridge device 504. After the bridge device 504 verifies the blockchain transaction data in the blockchain blocks, the blockchain blocks can be considered trusted blocks. The blockchain blocks that have been verified by the bridge device 504 are indicated by the check height value.

In some embodiments, the check height value continuously increments (e.g., increases by 1 every time), which ensures that the blockchain transactions in the blockchain blocks less than (or below) the check height value have been completely processed by the bridge device 504. In some embodiments, a recovery process of the bridge device 504 can start from the check height value when a system fault or failure occurs. In some embodiments, even if the block data in the bridge device 504 is lost or compromised, the lost or compromised block data can be recovered by resetting the local height value to the check height value and monitoring the block notification from the blockchain network node 506 to update the remote height value.

Figure 6A:
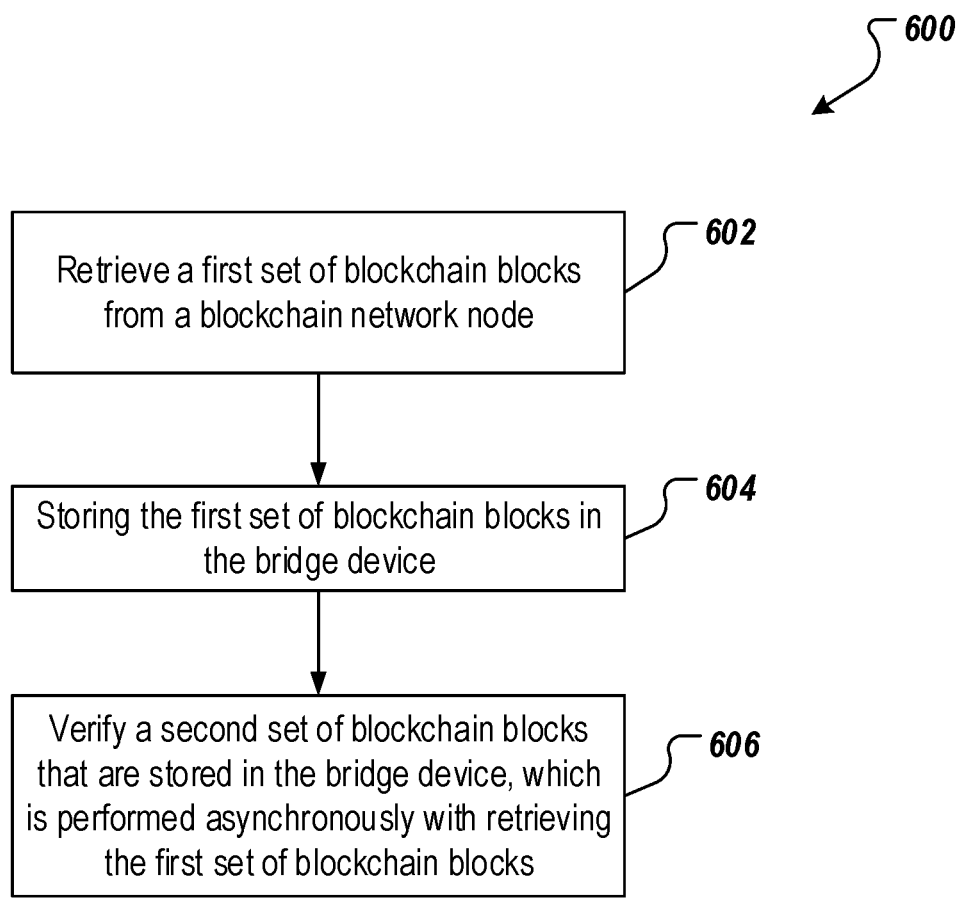
FIG. 6A is a flowchart illustrating a process for asynchronous processing of blockchain blocks that can be executed in accordance with embodiments of this specification.

FIG. 6A is a flowchart illustrating an example of a process 600 for implementation of a blockchain-based fault-tolerant system which can be executed in accordance with embodiments of this specification. The process 600 can be a process performed by a blockchain-based fault-tolerant system in the context of the process 500 of FIG. 5. For convenience, the process 600 will be described as being performed by a system of one or more computers, located in one or more locations, and programmed appropriately in accordance with this specification. For example, a blockchain data processing system, (e.g., the system 300 of FIG. 3) appropriately programmed, can perform the process 600.

At 602, a bridge device (e.g., bridge device 304a of FIG. 3, or bridge device 504 of FIG. 5) retrieves a first set of blockchain blocks from a blockchain network node (e.g., blockchain network node 306 of FIG. 3), for example, using a first set of threads of the bridge device. For example, the first set of blockchain blocks can include more than one blockchain blocks (e.g., a first blockchain block and a second blockchain block), and the first set of threads can include more than one threads (e.g., a first thread and a second thread). The bridge device can use the first thread and the second thread to retrieve the first blockchain block and the second blockchain block respectively and in parallel.

At 604, the bridge device stores the first set of blockchain blocks in the bridge device. For example, the bridge device can store the first blockchain block and the second blockchain block in a memory of the bridge device. In some embodiments, the bridge device can store a second set of blockchain blocks in addition to the first set of blockchain blocks. For example, the second set of blockchain blocks can be retrieved by the bridge device from the blockchain network node at an earlier time than the first set of blockchain blocks.

At 606, the bridge device verifies the second set of blockchain blocks that are stored in the bridge device, for example, using a second set of threads of the bridge device. In some embodiments, the second set of blockchain blocks can include more than one blockchain blocks (e.g., a third blockchain block and a fourth blockchain block), and the second set of threads can include more than one threads (e.g., a third thread and a fourth thread). The bridge device can use the third thread and the fourth thread to verify the third and the fourth blockchain blocks respectively and in parallel.

In some embodiments, the bridge device performs retrieving the first set of blockchain blocks and verifying the second set of blockchain blocks asynchronously using the first set of threads and the second set of threads. As noted before, when two operations are performed asynchronously, execution of one operation will not block or suspend execution of the other operation. One operation can start without waiting for the other operation to complete and both operations can be executing simultaneously. For example, the bridge device can retrieve the first set of blockchain blocks and verify the second set of blockchain blocks in a parallel manner. The bridge device can verify the second set of blockchain blocks using the second set of threads while retrieving the first set of blockchain blocks using the first set of threads.

Figure 6B:
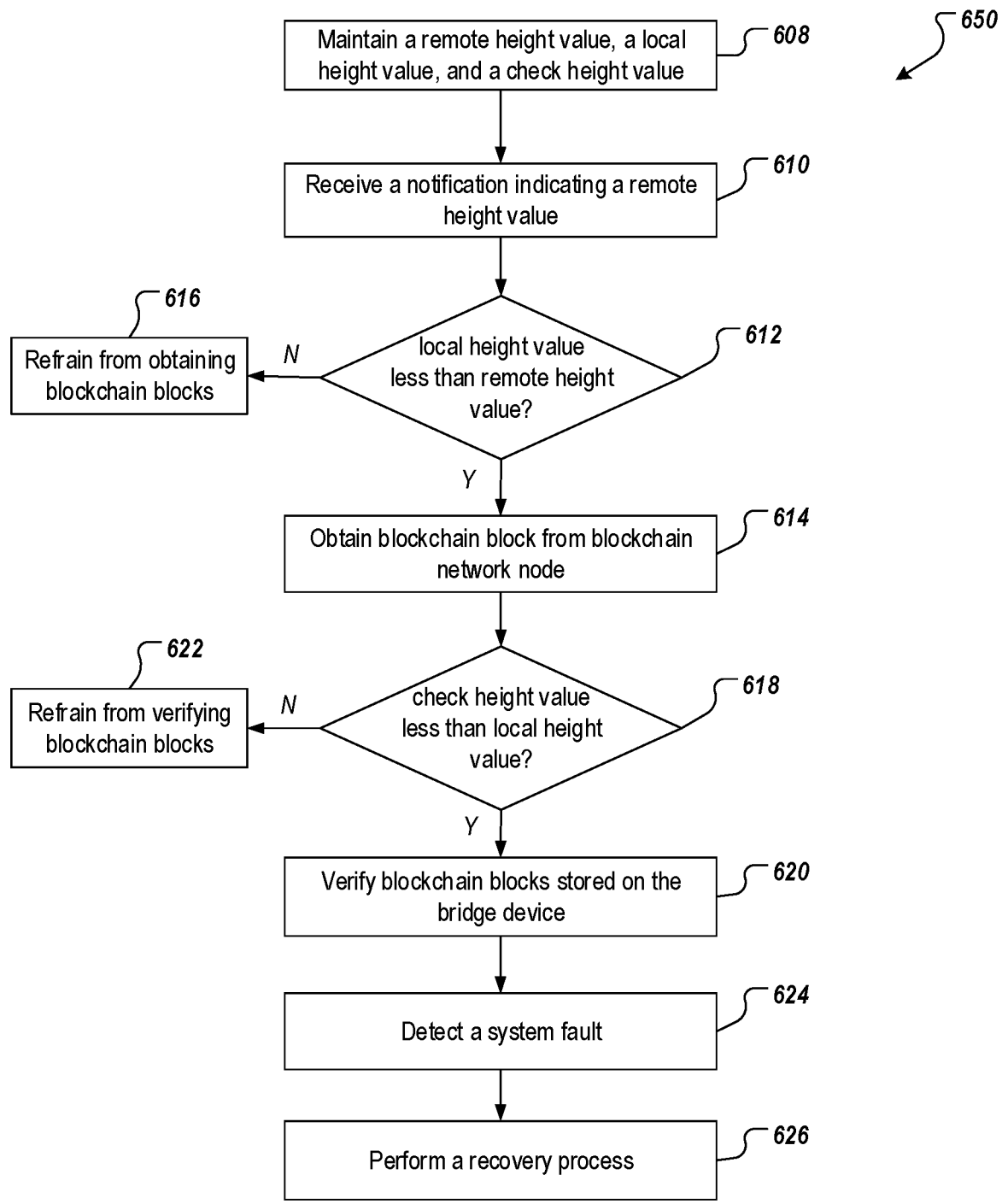
FIG. 6B is a flowchart illustrating a process for asynchronous processing of blockchain blocks, which can be used, for example, for implementing a blockchain-based fault-tolerant system that can be executed in accordance with embodiments of this specification.

FIG. 6B is a flowchart illustrating a process 650 for asynchronous processing of blockchain blocks, which can be used, for example, for implementing a blockchain-based fault-tolerant system that can be executed in accordance with embodiments of this specification. The process 650 can be an example of implementation of the process 600.

At 608, a bridge device (e.g., bridge device 304*a* of FIG. 3, or bridge device 504 of FIG. 5) maintains a remote height value (e.g., remote height value 402 of FIG. 4), a local height value (e.g., local height value 404 of FIG. 4), and a check height value (e.g., check height value 406) in a data store (e.g., a non-volatile storage medium) of the bridge device. In some embodiments, the remote height value indicates a number of blockchain blocks that are stored on a blockchain network node (e.g., the blockchain network node 306 of FIG. 3, or the blockchain network node 506 of FIG. 5) that is communicatively linked to the bridge device. The local height value indicates a number of blockchain blocks that are stored on the bridge device. The check height value indicates a number of blockchain blocks that have been verified by the bridge device. In some embodiments, the blockchain network node is a consensus node of a blockchain network.

At 610, the bridge device receives a notification from the blockchain network node. In some embodiments, the notification indicates the remote height value. In some embodiments, the notification includes a new block notification that indicates a new block has been added to a blockchain of the blockchain network. In some embodiments, the new block notification indicates that the remote height value is increased by a certain value (e.g., increased by 1).

In some embodiments, the bridge device can receive the notification from the blockchain network node in a push or pull mode. For example, the blockchain network node can push the notification to the bridge device based on a subscription of the bridge device and/or the client device, periodically or dynamically in response to the generation of a new blockchain block. As another example, the bridge device can pull the notification from the blockchain network node by sending a request for the notification to the blockchain network node.

In some embodiments, the bridge device can receive a transaction request from a client device (e.g., client device 302 of FIG. 3, or client device 502 of FIG. 5) that requests a transaction to be executed on the blockchain network. The bridge device can forward the transaction request to the blockchain network node. The blockchain network node can send a second notification to the bridge device. The second notification can indicate an updated remote height value and the updated remote height value can indicate an increase in the number of blockchain blocks that are stored on the blockchain network node based on the transaction.

At 612, the bridge device determines whether the local height value is less than the remote height value. In some embodiments, if it is determined that the local height value is less than the remote height value, the bridge device can retrieve blockchain blocks from the blockchain network node. If it is determined that the local height value is not less than the remote height value, the bridge device 504 can refrain from retrieving blockchain blocks from the blockchain network node.

At 614, in response to determining that the local height value is less than the remote height value, the bridge device obtains at least one blockchain block that is not stored on the bridge device from the blockchain network node. For example, the bridge device can retrieve a blockchain block from the blockchain network node, where the blockchain block is subsequent to the latest blockchain block in the number of blockchain blocks that are stored on the bridge device and that are indicated by the local height value. In some embodiments, in response to obtaining the at least one blockchain block from the blockchain network node, the bridge device can store the at least one blockchain block on the bridge device and update the local height value. In some embodiments, the bridge device can keep retrieving the blockchain blocks from the blockchain network node and updating the local height value until the local height value equals the remote height value.

At 616, in response to determining that the local height value is not less than the remote height value, the bridge device refrains from obtaining blockchain blocks from the blockchain network node. For example, if the local height value equals the remote height value, the bridge device can stop or refrain from retrieving blockchain blocks from the blockchain network node.

At 618, the bridge device determines whether the check height value is less than the local height value. In some embodiments, if it is determined that the check height value is less than the local height value, the bridge device can verify a blockchain block that is stored on the bridge device and that has not been verified by the bridge device. If it is determined that the check height value is not less than the local height value, the bridge device can refrained from verifying blockchain blocks that are stored on the bridge device.

At 620, in response to determining that the check height value is less than the local height value, the bridge device verifies a blockchain block that is stored on the bridge device and that has not been verified by the bridge device. In some embodiments, the verifying can include determining a consistency between one or more blockchain transactions in the blockchain block and a transaction request. In some embodiments, the bridge device can verify the blockchain blocks by comparing transaction data recorded in the blockchain blocks to the data included in the transaction request that is sent by the client device to the bridge device.

In some embodiments, the bridge device can further verify a blockchain block based on a hash value of the blockchain transactions in the blockchain block. For example, the blockchain block can include a blockchain transaction and a first hash value of the blockchain transaction. The bridge device can obtain the blockchain transaction from the blockchain block and compute a second hash value of the blockchain transaction. The bridge device can compare the second hash value with the first hash value. If it is determined that the two hash values match, the bridge device can determine that the blockchain transaction in the blockchain block has not been tampered with and that the blockchain block is a trusted block.

In some embodiments, in response to verifying the blockchain block, the bridge device can determine that the blockchain block is trustworthy and update the check height value. In some embodiments, the bridge device can keep verifying the blockchain blocks that are stored on the bridge device and updating the check height value until the check height value equals the local height value.

At 622, in response to determining that the check height value is not less than the local height value, the bridge device refrains from verifying blockchain blocks that are stored on the bridge device. For example, if the check height value equals the local height value, the bridge device 504 can refrain from verifying the blockchain blocks stored on the bridge device 504.

At 624, a system fault is detected. In some embodiments, the system fault can include software bugs and errors, hard disk failures, input or output device failures, or other temporary or permanent failures. In some embodiments, the system fault can cause a communications connection to be lost between the bridge device and the blockchain network node. In some examples, the blockchain blocks that are stored on the bridge device can be compromised or lost due to the system fault.

At 626, the bridge device performs a recovery process in response to detecting the system fault. In some embodiments, the bridge device can set the local height value to the check height value. In response to determining that the local height value is less than the remote height value, the bridge device can obtain at least one blockchain block subsequent to the latest blockchain block in the number of blockchain blocks that have been verified by the bridge device and that are indicated by the check height value.

In some embodiments, during and/or after the recovery process, the bridge device can go back to 608 for maintaining the three cursor values and continue the process 650. In some embodiments, as described with respect to FIGS. 4-5, the process 650 can be performed by one or more independent threads of the bridge device, which can improve the processing speed and flexibility of the bridge device, and increase throughput of communications between the client device and the blockchain network node while providing fault tolerance and maintaining an ordered executions of block-related processing to enhance data security and trustworthy stored by the bridge device and communicated between the client device and the blockchain network node.

Figure 7:
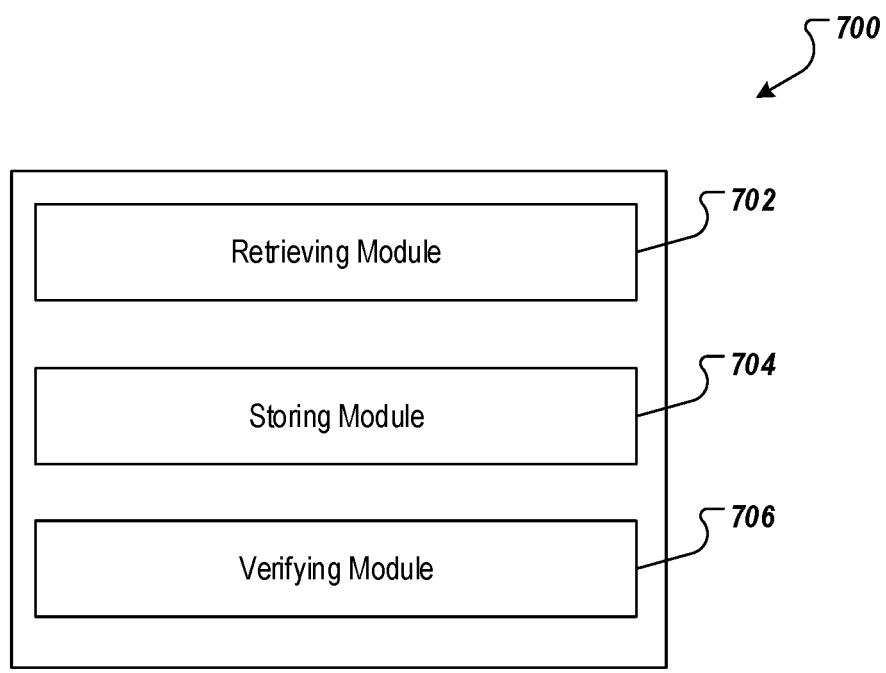
FIG. 7 is a diagram illustrating an example of modules of an apparatus in accordance with embodiments of this specification.

FIG. 7 is a diagram of an example of modules of an apparatus 700 in accordance with embodiments of this specification. The apparatus 700 can be an example of an embodiment of a bridge device (e.g., bridge device 304a of FIG. 3, or bridge device 504 of FIG. 5). The apparatus 700 can correspond to the embodiments described above, and the apparatus 700 includes the following: a retrieving module 702 that retrieves a first set of blockchain blocks from the blockchain network node using a first set of threads of the bridge device; a storing module 704 that stores the first set of blockchain blocks in the bridge device; and a verifying module 706 that verifies a second set of blockchain blocks that are stored in the bridge device using a second set of threads of the bridge device, wherein the first set of threads are different from the second set of threads, and wherein retrieving the first set of blockchain blocks and verifying the second set of blockchain blocks are performed asynchronously using the first set of threads and the second set of threads.

In some embodiments, the first set of blockchain blocks include a first blockchain block and a second blockchain block, wherein the first set of threads include a first thread and a second thread, and wherein retrieving the first set of blockchain blocks from the blockchain network node using the first set of threads of the bridge device includes: retrieving the first blockchain block from the blockchain network node using the first thread of the bridge device in parallel with retrieving the second blockchain block from the blockchain network node using the second thread of the bridge device.

In some embodiments, the second set of blockchain blocks include a third blockchain block and a fourth blockchain block, wherein the second set of threads include a third thread and a fourth thread, and wherein verifying the second set of blockchain blocks that are stored in the bridge device using the second set of threads of the bridge device includes: verifying the third blockchain block using the third thread of the bridge device in parallel with verifying the fourth blockchain block using the fourth thread of the bridge device.

In some embodiments, the apparatus 700 further includes a maintaining sub-module that maintains a remote height value and a local height value in a data store of the bridge device, wherein: the remote height value indicates a number of blockchain blocks that are stored on the blockchain network node; and the local height value indicates a number of blockchain blocks that are stored on the bridge device and that have been obtained from the blockchain network node. Retrieving the first set of blockchain blocks from the blockchain network node using the first set of threads of the bridge device includes: determining whether the local height value is less than the remote height value by the bridge device; and in response to determining that the local height value is less than the remote height value, obtaining at least one blockchain block that is not stored on the bridge device from the blockchain network node.

In some embodiments, the apparatus 700 further includes: a storing sub-module that stores the at least one blockchain block on the bridge device in response to obtaining the at least one blockchain block from the blockchain network node; and an updating sub-module that updates the local height value by the bridge device.

In some embodiments, the apparatus 700 further includes a refraining sub-module that refrains from obtaining blockchain blocks from the blockchain network node in response to determining that the local height value is not less than the remote height value.

In some embodiments, the apparatus 700 further includes: a first receiving sub-module that receives a notification from the blockchain network node by the bridge device, the notification indicating the remote height value; a second receiving sub-module that receives a transaction request from a client device by the bridge device, the transaction request requesting a transaction to be executed on a blockchain network; a sending sub-module that sends the transaction request to the blockchain network node by the bridge device; and a third receiving sub-module that receives a second notification from the blockchain network node by the bridge device, the second notification indicating an updated remote height value, wherein the updated remote height value indicates an increase in the number of blockchain blocks that are stored on the blockchain network node based at least in part on the transaction.

In some embodiments, the notification comprises a new block notification indicating a new block has been added to a blockchain of the blockchain network, and the new block notification indicating the remote height value is increased, for example, by 1.

In some embodiments, receiving the notification from the blockchain network node by the bridge device includes at least one of the following: receiving the notification that is pushed by the blockchain network node to the bridge device; or pulling the notification from the blockchain network node by the bridge device.

In some embodiments, the apparatus 700 further includes a maintaining sub-module that maintains a local height value and a check height value in a data store of the bridge device, wherein: the local height value indicates a number of blockchain blocks that are stored on the bridge device and that have been obtained from the blockchain network node; and the check height value indicates a number of blockchain blocks that have been verified by the bridge device. Verifying the second set of blockchain blocks that are stored in the bridge device using the second set of threads of the bridge device includes: determining whether the check height value is less than the local height value; and in response to determining that the check height value is less than the local height value, verifying a blockchain block that is stored in the bridge device and that has not been verified by the bridge device.

In some embodiments, verifying the blockchain block that is stored in the bridge device and that has not been verified by the bridge device includes determining a consistency between one or more blockchain transactions in the blockchain block and a transaction request.

In some embodiments, the apparatus 700 further includes: a determining sub-module that determines that the blockchain block is trustworthy in response to verifying the blockchain block that is stored on the bridge device and that has not been verified by the bridge device; and an updating sub-module that updates the check height value by the bridge device.

In some embodiments, the apparatus 700 further includes a refraining sub-module that refrains from verifying blockchain blocks that are stored in the bridge device in response to determining that the check height value is not less than the local height value.

In some embodiments, the apparatus 700 further includes: a detecting sub-module that detects a system fault in a system comprising the bridge device and the blockchain network node by the bridge device; and a performing sub-module that performs a recovery process based on the check height value. Performing the recovery process includes: setting the local height value equal to the check height value; and in response to determining that the local height value is less than a remote height value that indicates a number of blockchain blocks that are stored on the blockchain network node, obtaining at least one blockchain block that is not stored on the bridge device from the blockchain network node.

The system, apparatus, module, or unit illustrated in the previous embodiments can be implemented by using a computer chip or an entity, or can be implemented by using a product having a certain function. A typical embodiment device is a computer (and the computer can be a personal computer), a laptop computer, a cellular phone, a camera phone, a smartphone, a personal digital assistant, a media player, a navigation device, an email receiving and sending device, a game console, a tablet computer, a wearable device, or any combination of these devices.

For an embodiment process of functions and roles of each module in the apparatus, references can be made to an embodiment process of corresponding steps in the previous method. Details are omitted here for simplicity.

Because an apparatus embodiment basically corresponds to a method embodiment, for related parts, references can be made to related descriptions in the method embodiment. The previously described apparatus embodiment is merely an example. The modules described as separate parts may or may not be physically separate, and parts displayed as modules may or may not be physical modules, may be located in one position, or may be distributed on a number of network modules. Some or all of the modules can be selected based on actual demands to achieve the objectives of the solutions of the specification. A person of ordinary skill in the art can understand and implement the embodiments of the present application without creative efforts.

Referring again to FIG. 7, it can be interpreted as illustrating an internal functional module and a structure of a fault-tolerant blockchain data processing apparatus. The fault-tolerant blockchain data processing apparatus can be an example of a bridge device (e.g., bridge device 304a of FIG. 3, or bridge device 504 of FIG. 5) configured to connect a client device and a blockchain network node of a blockchain network. An execution body in essence can be an electronic device, and the electronic device includes the following: one or more processors; and one or more computer-readable memories configured to store an executable instruction of the one or more processors. In some embodiments, the one or more computer-readable memories are coupled to the one or more processors and have programming instructions stored thereon that are executable by the one or more processors to perform algorithms, methods, functions, processes, flows, and procedures as described in this specification. This specification also provides one or more non-transitory computer-readable storage media coupled to one or more processors and having instructions stored thereon which, when executed by the one or more processors, cause the one or more processors to perform operations in accordance with embodiments of the methods provided herein.

This specification further provides a system for implementing the methods provided herein. The system includes one or more processors, and a computer-readable storage medium coupled to the one or more processors having instructions stored thereon which, when executed by the one or more processors, cause the one or more processors to perform operations in accordance with embodiments of the methods provided herein.

Embodiments of the subject matter and the actions and operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, e.g., one or more modules of computer program instructions, encoded on a computer program carrier, for execution by, or to control the operation of, data processing apparatus. For example, a computer program carrier can include one or more computer-readable storage media that have instructions encoded or stored thereon. The carrier may be a tangible non-transitory computer-readable medium, such as a magnetic, magneto optical, or optical disk, a solid state drive, a random access memory (RAM), a read-only memory (ROM), or other types of media. Alternatively, or in addition, the carrier may be an artificially generated propagated signal, e.g., a machine-generated electrical, optical, or electromagnetic signal that is generated to encode information for transmission to suitable receiver apparatus for execution by a data processing apparatus. The computer storage medium can be or be part of a machine-readable storage device, a machine-readable storage substrate, a random or serial access memory device, or a combination of one or more of them. A computer storage medium is not a propagated signal.

A computer program, which may also be referred to or described as a program, software, a software application, an app, a module, a software module, an engine, a script, or code, can be written in any form of programming language, including compiled or interpreted languages, or declarative or procedural languages; and it can be deployed in any form, including as a stand-alone program or as a module, component, engine, subroutine, or other unit suitable for executing in a computing environment, which environment may include one or more computers interconnected by a data communication network in one or more locations.

A computer program may, but need not, correspond to a file in a file system. A computer program can be stored in a portion of a file that holds other programs or data, e.g., one or more scripts stored in a markup language document, in a single file dedicated to the program in question, or in multiple coordinated files, e.g., files that store one or more modules, sub programs, or portions of code.

Processors for execution of a computer program include, by way of example, both general- and special-purpose microprocessors, and any one or more processors of any kind of digital computer. Generally, a processor will receive the instructions of the computer program for execution as well as data from a non-transitory computer-readable medium coupled to the processor.

The term "data processing apparatus" encompasses all kinds of apparatuses, devices, and machines for processing data, including by way of example a programmable processor, a computer, or multiple processors or computers. Data processing apparatus can include special-purpose logic circuitry, e.g., an FPGA (field programmable gate array), an ASIC (application specific integrated circuit), or a GPU (graphics processing unit). The apparatus can also include, in addition to hardware, code that creates an execution environment for computer programs, e.g., code that constitutes processor firmware, a protocol stack, a database management system, an operating system, or a combination of one or more of them.

The processes and logic flows described in this specification can be performed by one or more computers or processors executing one or more computer programs to perform operations by operating on input data and generating output. The processes and logic flows can also be performed by special-purpose logic circuitry, e.g., an FPGA, an ASIC, or a GPU, or by a combination of special-purpose logic circuitry and one or more programmed computers.

Computers suitable for the execution of a computer program can be based on general or special-purpose microprocessors or both, or any other kind of central processing unit. Generally, a central processing unit will receive instructions and data from a read only memory or a random access memory or both. Elements of a computer can include a central processing unit for executing instructions and one or more memory devices for storing instructions and data. The central processing unit and the memory can be supplemented by, or incorporated in, special-purpose logic circuitry.

Generally, a computer will also include, or be operatively coupled to receive data from or transfer data to one or more storage devices. The storage devices can be, for example, magnetic, magneto optical, or optical disks, solid state drives, or any other type of non-transitory, computer-readable media. However, a computer need not have such devices. Thus, a computer may be coupled to one or more storage devices, such as, one or more memories, that are local and/or remote. For example, a computer can include one or more local memories that are integral components of the computer, or the computer can be coupled to one or more remote memories that are in a cloud network. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Components can be "coupled to" each other by being commutatively such as electrically or optically connected to one another, either directly or via one or more intermediate components. Components can also be "coupled to" each other if one of the components is integrated into the other. For example, a storage component that is integrated into a processor (e.g., an L2 cache component) is "coupled to" the processor.

To provide for interaction with a user, embodiments of the subject matter described in this specification can be implemented on, or configured to communicate with, a computer having a display device, e.g., a LCD (liquid crystal display) monitor, for displaying information to the user, and an input device by which the user can provide input to the computer, e.g., a keyboard and a pointing device, e.g., a mouse, a trackball or touchpad. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser, or by interacting with an app running on a user device, e.g., a smartphone or electronic tablet. Also, a computer can interact with a user by sending text messages or other forms of message to a personal device, e.g., a smartphone that is running a messaging application, and receiving responsive messages from the user in return.

This specification uses the term "configured to" in connection with systems, apparatus, and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions. For special-purpose logic circuitry to be configured to perform particular operations or actions means that the circuitry has electronic logic that performs the operations or actions.

While this specification contains many specific embodiment details, these should not be construed as limitations on the scope of what is being claimed, which is defined by the claims themselves, but rather as descriptions of features that may be specific to particular embodiments. Certain features that are described in this specification in the context of separate embodiments can also be realized in combination in a single embodiment. Conversely, various features that are described in the context of a single embodiments can also be realized in multiple embodiments separately or in any suitable subcombination. Moreover, although features may be described above as acting in certain combinations and even initially be claimed as such, one or more features from a claimed combination can in some cases be excised from the combination, and the claim may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

The invention claimed is:

1. A computer-implemented method, comprising:
    retrieving, by a bridge device communicatively linked to a blockchain network node of a blockchain network, a first set of blockchain blocks from the blockchain network node using a first set of threads of the bridge device, wherein the first set of blockchain blocks are generated by the blockchain network node after a first consensus process performed by consensus nodes of the blockchain network, wherein the bridge device is separate from the consensus nodes of the blockchain network and the bridge device is communicatively linked to a client device;
    storing, by the bridge device, the first set of blockchain blocks in the bridge device;
    retrieving, by the bridge device, a second set of blockchain blocks from the blockchain network node using a second set of threads of the bridge device, wherein the second set of blockchain blocks are generated by the blockchain network node after a second consensus process performed by the consensus nodes of the blockchain network; and
    verifying, by the bridge device, the first set of blockchain blocks that have been stored in the bridge device using a third set of threads of the bridge device; and
    wherein retrieving the second set of blockchain blocks and verifying the first set of blockchain blocks are performed asynchronously using the second set of threads and the third set of threads.

2. The computer-implemented method of claim 1, wherein the second set of blockchain blocks comprise a first blockchain block and a second blockchain block, wherein the second set of threads comprise a first thread and a second thread, and wherein retrieving the second set of blockchain blocks from the blockchain network node using the second set of threads of the bridge device comprises:
    retrieving the first blockchain block from the blockchain network node using the first thread of the bridge device in parallel with
    retrieving the second blockchain block from the blockchain network node using the second thread of the bridge device.

3. The computer-implemented method of claim 1, wherein the first set of blockchain blocks comprise a third blockchain block and a fourth blockchain block, wherein the third set of threads comprise a third thread and a fourth thread, and wherein verifying the first set of blockchain blocks that are stored in the bridge device using the third set of threads of the bridge device comprises:
    verifying the third blockchain block using the third thread of the bridge device in parallel with
    verifying the fourth blockchain block using the fourth thread of the bridge device.

4. The computer-implemented method of claim 1, further comprising:
    maintaining a remote height value and a local height value in a data store of the bridge device, wherein:
        the remote height value indicates a number of blockchain blocks that are stored on the blockchain network node; and
        the local height value indicates a number of blockchain blocks that are stored on the bridge device and that have been obtained from the blockchain network node,
    wherein retrieving the second set of blockchain blocks from the blockchain network node using the second set of threads of the bridge device comprises:
        determining whether the local height value is less than the remote height value by the bridge device; and
        in response to determining that the local height value is less than the remote height value, obtaining at least one blockchain block that is not stored on the bridge device from the blockchain network node.

5. The computer-implemented method of claim 4, further comprising:
    in response to storing the first set of blockchain blocks in the bridge device,
    updating the local height value by the bridge device to account for the first set of blockchain blocks;
    storing the second set of blockchain blocks in the bridge device; and
    in response to storing the second set of blockchain blocks in the bridge device, updating the local height value by the bridge device to account for the second set of blockchain blocks.

6. The computer-implemented method of claim 4, further comprising:
in response to determining that the local height value is not less than the remote height value, refraining from obtaining blockchain blocks from the blockchain network node.

7. The computer-implemented method of claim 4, further comprising:
receiving a notification from the blockchain network node by the bridge device, the notification indicating the remote height value;
receiving a transaction request from the client device by the bridge device, the transaction request requesting a transaction to be executed on the blockchain network;
sending the transaction request to the blockchain network node by the bridge device; and
receiving a second notification from the blockchain network node by the bridge device, the second notification indicating an updated remote height value, wherein the updated remote height value indicates an increase in the number of blockchain blocks that are stored on the blockchain network node based at least in part on the transaction.

8. The computer-implemented method of claim 7, wherein the notification comprises a new block notification indicating a new block has been added to a blockchain of the blockchain network, and the new block notification indicating the remote height value is increased.

9. The computer-implemented method of claim 7, wherein receiving the notification from the blockchain network node by the bridge device comprises at least one of the following:
receiving the notification that is pushed by the blockchain network node to the bridge device; or
pulling the notification from the blockchain network node by the bridge device.

10. The computer-implemented method of claim 1, further comprising:
maintaining a local height value and a check height value in a data store of the bridge device, wherein:
the local height value indicates a number of blockchain blocks that are stored on the bridge device and that have been obtained from the blockchain network node; and
the check height value indicates a number of blockchain blocks that have been verified by the bridge device;
wherein verifying the first set of blockchain blocks that are stored in the bridge device using the third set of threads of the bridge device comprises:
determining whether the check height value is less than the local height value; and
in response to determining that the check height value is less than the local height value, verifying a blockchain block that is stored in the bridge device and that has not been verified by the bridge device.

11. The computer-implemented method of claim 10, wherein verifying the blockchain block that is stored in the bridge device and that has not been verified by the bridge device comprises determining a consistency between one or more blockchain transactions in the blockchain block and a transaction request.

12. The computer-implemented method of claim 10, further comprising:
in response to verifying the blockchain block that is stored on the bridge device and that has not been verified by the bridge device, determining that the blockchain block is trustworthy; and
updating the check height value by the bridge device.

13. The computer-implemented method of claim 10, further comprising:
in response to determining that the check height value is not less than the local height value, refraining from verifying blockchain blocks that are stored in the bridge device.

14. The computer-implemented method of claim 10, further comprising:
detecting a system fault in a system comprising the bridge device and the blockchain network node by the bridge device; and
in response to detecting the system fault, performing a recovery process based on the check height value, wherein performing the recovery process comprises:
setting the local height value equal to the check height value; and
in response to determining that the local height value is less than a remote height value that indicates a number of blockchain blocks that are stored on the blockchain network node, obtaining at least one blockchain block that is not stored on the bridge device from the blockchain network node.

15. A non-transitory, computer-readable medium storing one or more instructions executable by a computer system to perform operations comprising:
retrieving, by a bridge device communicatively linked to a blockchain network node of a blockchain network, a first set of blockchain blocks from the blockchain network node using a first set of threads of the bridge device, wherein the first set of blockchain blocks are generated by the blockchain network node after a first consensus process performed by consensus nodes of the blockchain network, wherein the bridge device is separate from the consensus nodes of the blockchain network and the bridge device is communicatively linked to a client device;
storing, by the bridge device, the first set of blockchain blocks in the bridge device;
retrieving, by the bridge device, a second set of blockchain blocks from the blockchain network node using a second set of threads of the bridge device, wherein the second set of blockchain blocks are generated by the blockchain network node after a second consensus process performed by the consensus nodes of the blockchain network; and
verifying, by the bridge device, the first set of blockchain blocks that have been stored in the bridge device using a third set of threads of the bridge device; and
wherein retrieving the second set of blockchain blocks and verifying the first set of blockchain blocks are performed asynchronously using the second set of threads and the third set of threads.

16. The non-transitory, computer-readable medium of claim 15, wherein the second set of blockchain blocks comprise a first blockchain block and a second blockchain block, wherein the second set of threads comprise a first thread and a second thread, and wherein retrieving the second set of blockchain blocks from the blockchain network node using the second set of threads of the bridge device comprises:

retrieving the first blockchain block from the blockchain network node using the first thread of the bridge device in parallel with retrieving the second blockchain block from the blockchain network node using the second thread of the bridge device.

17. The non-transitory, computer-readable medium of claim 15, wherein the first set of blockchain blocks comprise a third blockchain block and a fourth blockchain block, wherein the third set of threads comprise a third thread and a fourth thread, and wherein verifying the first set of blockchain blocks that are stored in the bridge device using the third set of threads of the bridge device comprises:

verifying the third blockchain block using the third thread of the bridge device in parallel with verifying the fourth blockchain block using the fourth thread of the bridge device.

18. A computer-implemented system, comprising:

one or more computers; and one or more computer memory devices interoperably coupled with the one or more computers and having tangible, non-transitory, machine-readable media storing one or more instructions that, when executed by the one or more computers, perform one or more operations comprising:

retrieving, by a bridge device communicatively linked to a blockchain network node of a blockchain network, a first set of blockchain blocks from the blockchain network node using a first set of threads of the bridge device, wherein the first set of blockchain blocks are generated by the blockchain network node after a first consensus process performed by consensus nodes of the blockchain network, wherein the bridge device is separate from the consensus nodes of the blockchain network and the bridge device is communicatively linked to a client device;

storing, by the bridge device, the first set of blockchain blocks in the bridge device;

retrieving, by the bridge device, a second set of blockchain blocks from the blockchain network node using a second set of threads of the bridge device, wherein the second set of blockchain blocks are generated by the blockchain network node after a second consensus process performed by the consensus nodes of the blockchain network; and verifying, by the bridge device, the first set of blockchain blocks that have been stored in the bridge device using a third set of threads of the bridge device; and wherein retrieving the second set of blockchain blocks and verifying the first set of blockchain blocks are performed asynchronously using the second set of threads and the third set of threads.

19. The computer-implemented system of claim 18, wherein the second set of blockchain blocks comprise a first blockchain block and a second blockchain block, wherein the second set of threads comprise a first thread and a second thread, and wherein retrieving the second set of blockchain blocks from the blockchain network node using the second set of threads of the bridge device comprises:

retrieving the first blockchain block from the blockchain network node using the first thread of the bridge device in parallel with retrieving the second blockchain block from the blockchain network node using the second thread of the bridge device.

20. The computer-implemented system of claim 18, wherein the first set of blockchain blocks comprise a third blockchain block and a fourth blockchain block, wherein the third set of threads comprise a third thread and a fourth thread, and wherein verifying the first set of blockchain blocks that are stored in the bridge device using the third set of threads of the bridge device comprises:

verifying the third blockchain block using the third thread of the bridge device in parallel with verifying the fourth blockchain block using the fourth thread of the bridge device.

* * * * *